US005992391A

United States Patent [19]

Yamakado et al.

[11] Patent Number: 5,992,391

[45] Date of Patent: Nov. 30, 1999

[54] ELECTROMAGNETIC FUEL INJECTOR AND CONTROL METHOD THEREOF

[75] Inventors: Makoto Yamakado, Tsuchiura; Yoshio Okamoto, Minori-machi; Nobukatsu Arai, Ushiku; Yuzo Kadomukai, Ishioka; Yoshiyuki Tanabe; Yasunaga Hamada, both of Hitachinaka; Yasuo Namaizawa, Kashima; Hiromasa Kubo, Yokohama; Kenji Tabuchi, Hitachinaka, all of Japan

[73] Assignees: Hitachi, Ltd., Tokyo, Japan; Hitachi Car Engineering Co., Ltd., Ibaraki, Japan

[21] Appl. No.: 09/105,208

[22] Filed: Jun. 26, 1998

[30] Foreign Application Priority Data

| | | | |
|---|---|---|---|
| Jun. 26, 1997 | [JP] | Japan | 9-170498 |
| Sep. 9, 1997 | [JP] | Japan | 9-243688 |
| Mar. 10, 1998 | [JP] | Japan | 10-057699 |

[51] Int. Cl.[6] .......... F02M 51/06; F16K 31/06

[52] U.S. Cl. .......... 123/490; 251/129.03; 251/129.1; 361/147; 361/154

[58] Field of Search .......... 123/490, 494; 239/5, 585.1; 251/129.03, 129.09, 129.1; 361/147, 154, 155

[56] References Cited

U.S. PATENT DOCUMENTS

| | | | |
|---|---|---|---|
| 5,441,232 | 8/1995 | Tanaka | 251/129.1 X |
| 5,899,436 | 5/1999 | Holmes et al. | 251/129.1 X |

FOREIGN PATENT DOCUMENTS

| | | |
|---|---|---|
| 6-241137 | 8/1994 | Japan . |
| 8-326620 | 12/1996 | Japan . |

*Primary Examiner*—Tony M. Argenbright
*Attorney, Agent, or Firm*—Antonelli, Terry, Stout & Kraus, LLP

[57] ABSTRACT

An electromagnetic fuel injection valve for injecting fuel by opening/closing a fuel flow path, includes a valve seat, a valve element for opening/closing the fuel flow path formed between the valve seat and the valve element, and a drive unit having at least one coil for driving the valve element. The drive unit includes a first magnetomotive force generating device using the at least one coil and a second magnetomotive force generating device, the first magnetomotive force generating device and the second magnetomotive force generating device being composed so that the first magnetomotive force generating device generates and raises its magnetomotive force at a larger rate of change in time in comparison with the second magnetomotive force generating device. A valve open state is held by the second magnetomotive force generating device which uses a smaller current flow in comparison with the first magnetomotive force generating device.

22 Claims, 18 Drawing Sheets

(LARGE CONTROL COIL INDUCTANCE CASE)

(SMALL CONTROL COIL INDUCTANCE CASE)

(RELATION BETWEEN COIL CURRENT AND MAGNETIC ATTRACTION FORCE)

ELECTROMAGNETIC FUEL INJECTOR AND CONTROL METHOD THEREOF

BACKGROUND OF THE INVENTION

The present invention relates to a technique for injecting fuel by opening and closing a fuel supply path formed between a valve element and its valve seat in a fuel injector, the valve seat being driven by the application of an electrical current to coils of the fuel injector.

In an electromagnetic fuel injector (hereafter simply referred to as an injector), a plunger to which a valve element is attached is withdrawn from a valve seat by an electromagnetic force (electromagnetic attraction force) generated by a coil provided in the injector, in which current flows, whereby fuel is injected. When the electrical current flowing in the coil is stopped, the electromagnetic attraction force decays, and the plunger is pressed back by the force of a return spring in the valve closing direction. Thus, the valve of the injector is closed. In an injector of the above-mentioned type, the valve is required to immediately respond to an opening demand or a closing demand without a time delay in order to attain a wide dynamic range of fuel injection. The dynamic range refers to a range in which a linear relationship exists between the fuel injection amount and the valve opening time width, and is expressed by the ratio of the maximum injection amount to the minimum injection amount.

Conventionally, in order to improve the rise time characteristics of the valve opening operation, the following method has been adopted. That is, a high voltage is generated by providing a voltage step-up circuit, and a large current is caused to flow in an injector coil for a short time by applying the generated high voltage to the coil. For example, Japanese Patent Application Laid-Open 241137/1994 discloses a fuel injection control device in which a voltage step-up circuit is provided in a drive circuit for driving an electromagnetic fuel injection valve, and a voltage of 70 V, which is obtained by boosting a voltage of 12 V obtained from an external power source, using the provided voltage step-up circuit, is applied to a drive coil of the electromagnetic fuel injection valve.

In the above fuel injection control device, the excitation current for the drive coil is controlled so that a target value of the excitation current is set as a high value at an initial valve opening time in which a valve element is operated from a closed valve state to a valve opening state (early period in valve opening and during a process of opening the valve), and a low target value of the current is realized by on/off controlling of the drive coil during a valve open hold period in which the valve element is held at in the open state. Thus, the valve opening response is improved by controlling the excitation current for the drive coil at a high target value, and by controlling the excitation current at a low target value during the valve open hold state. In this way, the wasting of power is avoided, and heat generation is suppressed.

Japanese Patent Application Laid-Open 326620/1996 discloses an electromagnetic fuel injection valve in which two coils A and B are provided, and current is caused to flow in the two coils A and B for a preset period after the start of current flow in the coils during valve opening operations. Further, after a preset period, current flowing in the coil A is stopped, and current flows in only the coil B. In the above electromagnetic fuel injection valve, by causing current to flow in both of the two coils A and B for a preset period after the start of current flow in the coils, a strong magnetic flux can be generated and quick valve opening operations can be performed. Further, since a valve element can be held in an open valve state by a necessary and minimum force produced by only one of the two coils during the valve open hold period, a quick valve closing operation can be performed. Moreover, since a large current flows in the coils only at the time of valve opening, heat generation in the injection valve can be suppressed.

Furthermore, in the fuel injection control device disclosed in Japanese Patent Application Laid-Open 241137/1994, a detector for detecting the fuel feeding pressure (fuel pressure) is provided, and a high target value of the excitation current, or the control period for which the excitation current flows at the high target value, is adjusted, based on the fuel pressure defected by the detector. Thus, deterioration in the injection performance of the electromagnetic fuel injection valve, due to changes in the fuel pressure, is avoided.

In the fuel injection control device disclosed in Japanese Patent Application Laid-Open 241137/1994, in which only one coil is provided in the fuel injection valve, the valve element is controlled by the one coil from the start of valve open operations to the end of valve opening operations (valve closing) through holding of a valve open state.

It is necessary to decrease the current flowing in a coil in order to reduce heat generation or power consumption in the fuel injection valve. However, to obtain a sufficient magnetomotive force for holding a valve open state with a small coil current, it is necessary to increase the number of coil turns. On the other hand, since the rise time of the coil current should be made small to improve the response in valve opening, a greater increase in the voltage applied to the coil is required as the number of coil turns is increased. That is, the fuel injection control apparatus disclosed in Japanese Patent Application Laid-Open 241137/1994 has a structure which contradictory has characteristics relative to attaining both a quick response in valve opening and a low power consumption for the valve open hold period, if the same coil is controlled.

Further, since the above-mentioned voltage set-up circuit is expensive, and since insulation measures for the high voltage are necessary, the production cost is increased by adopting such a voltage step-up circuit. Therefore, in order to reduce the production cost, it is desirable to operate an injector with a lower voltage, and it is even more desirable to operate an injector with a battery voltage of 12 V, thereby eliminating a need for a voltage step-up circuit, if possible. Moreover, if an injector is driven by a lower voltage, fewer measures for securing its safety are required, and the maintenance or the adjustment of the injector becomes easier.

In the electromagnetic fuel injection valve disclosed in Japanese Patent Application 326620/1996, the structure and electromagnetic characteristics for each of the coils A and B are not disclosed. In providing two coils, securing a high response in the valve opening operation impedes the objective of holding a necessary and minimum magnetomotive force, and stably holding a necessary and minimum magnetomotive force causes a limitation on the attainment of a high response during the valve opening operation. Therefore, in accordance with this disclosed arrangement of two coils, it is difficult to attain a quick response of the valve opening operation, that is, largely to increase the valve element attraction force, which will be required in the future.

SUMMARY OF THE INVENTION

Thus, a first object of the present invention is to provide an electromagnetic fuel injection valve in which the response in driving a valve element from a closed valve state to a valve opening state is improved, and in which the valve opening state can be held stably and with a low power consumption.

A second object of the present invention is to provide an electromagnetic fuel injection apparatus having a wide dynamic range and a low power consumption.

A third object of the present invention is to provide an internal combustion engine in which stable operation can be maintained with a low fuel injection amount.

A fourth object of the present invention is to provide a fuel control method which can realize high response characteristics with a low power consumption.

To attain the first object, the present invention provides an electromagnetic fuel injection valve for injecting fuel by opening/closing a fuel supply passage, including a valve seat, a valve element for opening/closing the fuel supply passage formed between the valve seat and the valve element, and drive means having at least one coil, for driving the valve element, wherein the drive means includes a first magnetomotive force generating means using the at least one coil, and a second magnetomotive force generating means, the first magnetomotive force generating means and the second magnetomotive force generating means being composed so that the first magnetomotive force generating means generates and raises a magnetomotive force at a larger rate of change in time in comparison with the second magnetomotive force generating means.

An electromagnetic fuel injection valve according to the present invention, for injecting fuel by opening/closing a fuel supply passage, includes a valve seat, a valve element for opening/closing the fuel supply passage formed between the valve seat and the valve element, and drive means having at least one coil for driving the valve element, wherein the drive means includes at least one first coil and a second coil of which the number of turns is larger than that of the first coil.

In the above electromagnetic fuel injection valve, the wire diameter of the first coil is larger than that of the second coil.

Further, an electromagnetic fuel injection valve according to the present invention, for injecting fuel by opening/closing a fuel supply passage, includes a valve seat, a valve element for opening/closing the fuel supply passage formed between the valve seat and the valve element, and drive means having at least one coil, for driving the valve element, wherein the drive means includes at least one first coil and a second coil, the first coil and the second coil being composed so that if the same voltage having a rectangular waveform is applied to the first and second coils, the rise time of the magnetomotive force generated in the second coil will be longer than that in the first coil, a saturation value of current flowing in the second coil being smaller than that in the first coil.

To attain the second object, the present invention provides a fuel injection apparatus for injecting fuel by opening/closing a fuel supply passage, which includes an electromagnetic fuel injection valve having a valve seat, a valve element for opening/closing the fuel supply passage formed between the valve seat and the valve element, and drive means having at least one coil for driving the valve element, and control means for operating the electromagnetic fuel injection valve by controlling current flowing in the coil, wherein the drive means includes a first magnetomotive force generating means using the at least one coil and a second magnetomotive force generating means, the coil and the second magnetomotive force generating means generating a magnetomotive force in the same direction in which the force generated in the coil and the force generated in the second means strengthen each other at an initial valve opening time at which the valve element is driven from a closed valve state to a valve opening state, the coil raising the magnetomotive force at a larger rate of change in time in comparison with the second magnetomotive force generating means, and wherein the current flowing in the coil is stopped during a valve opening hold period for which a valve opening position of the valve element is held by the magnetomotive force generated by the second magnetomotive force generating means.

Further, a fuel injection apparatus according to the present invention, for injecting fuel by opening/closing a fuel supply passage, includes an electromagnetic fuel injection valve having a valve seat, a valve element for opening/closing the fuel supply path formed between the valve seat and the valve element, and drive means having at least one coil, for driving the valve element, and control means for operating the electromagnetic fuel injection valve by controlling current flowing in the coils, wherein said drive means includes at least one first coil and a second coil, the first coil and the second coil generating a magnetomotive force by causing current to flow in the first coil and the second coil in the same direction in which the force generated in the first coil and the force generated in the second coil strengthen each other at an initial valve opening time at which the valve element is driven from a valve closing state to a valve opening state, the first coil raising the magnetomotive force at a larger rate of change in time in comparison with the second coil, and wherein the current flowing in the first coil is stopped during a valve opening hold period for which a valve opening position of the valve element is held by the magnetomotive force generated by current flowing in the second coil.

To attain the third object, the present invention provides an internal combustion engine into which fuel is injected by opening/closing a fuel supply passage, which includes a fuel tank, a fuel pump for feeding and pressurizing the fuel from the fuel tank, an electromagnetic fuel injection valve for injecting the fuel pressurized by the fuel pump, which injection valve has a valve seat, a valve element for opening/closing the fuel supply passage formed between the valve seat and the valve element, and drive means having at least one coil for driving the valve element, and control means for determining fuel injection timing and a necessary fuel injection amount injected from the electromagnetic fuel injection valve and for operating the electromagnetic fuel injection valve by controlling current flowing in the coil, wherein said drive means includes a first magnetomotive force generating means using the at least one coil and a second magnetomotive force generating means, the coil and the second magnetomotive force generating means generating a magnetomotive force in the same direction in which the force generated in the coil and the force generated in the second means strengthen each other at an initial valve opening time at which the valve element is driven from a closed valve state to a valve opening state, the coil raising the magnetomotive force at a larger rate of change in time in comparison with the second magnetomotive force generating means, and wherein the current flowing in the coil is stopped during a valve opening hold period for which a valve opening position of the valve element is held by the magnetomotive force generated by the second magnetomotive force generating means.

Further, an internal combustion engine according to the present invention, into which fuel is injected by opening/ closing a fuel supply passage, includes a fuel tank, a fuel pump for feeding and pressurizing the fuel from the fuel tank, an electromagnetic fuel injection valve for injecting the fuel pressurized by the fuel pump, which injection valve has a valve seat, a valve element for opening/closing the fuel supply passage formed between the valve seat and the valve element, and drive means having at least one coil for driving the valve element, and control means for determining fuel injection timing and a necessary fuel injection amount from the electromagnetic fuel injection valve and for operating the electromagnetic fuel injection valve by controlling current flowing in the coil, wherein said drive means includes at least one first coil and a second coil, the first coil and the second coil generating a magnetomotive force by causing current to flow in the first coil and the second coil in the same direction in which the force generated in the first coil and the force generated in the second coil strengthen each other at an initial valve opening time at which the valve element is driven from a closed valve state to a valve opening state, the first coil raising the magnetomotive force at a larger rate of change in time in comparison with the second coil, and wherein the current flowing in the first coil is stopped during a valve opening hold period in which a valve opening position of the valve element is held by the magnetomotive force generated by current flowing in the second coil.

In the above fuel injection apparatus or internal combustion engine, reverse current flows in the first coil for a preset period, after which the current flowing in the first coil is stopped, and reverse current is again caused to flow in at least one of the first coil and the second coil for a preset period at the end of a fuel injection demand signal.

In the above fuel injection apparatus or internal combustion engine, at least one of a fuel pressure detector for detecting the pressure of fuel fed to the electromagnetic fuel injection valve and a voltage detector for detecting the voltage applied to the first coil is provided, and at least one of a relation between timing for stopping current flowing in the first coil and fuel pressure and a relation between timing for slopping current flowing in the first coil and the voltage applied to the coils is stored in storage means in the control means, and timing for stopping current flowing in the first coil is determined, based on an output from the detector and the relation.

Further, a method of injecting fuel by opening/closing a fuel supply passage with a valve element of an electromagnetic fuel injection valve, including first magnetomotive force generating means and second magnetomotive force generating means, which is driven by a magnetomotive force generated by using the first magnetomotive force generating means and the second magnetomotive force generating means, the fuel supply passage being formed between the driven valve element and a valve seat against which the valve element is seated, the method comprising the steps of: generating a magnetomotive force with at least one coil used as the first magnetomotive force generating means and with the second magnetomotive force generating means in a force direction in which the force generated in the coil and the force generated in the second means strengthen each other at an initial valve opening time at which the valve element is driven from a closed valve state to a valve opening state; raising the magnetomotive force in the coil at a larger rate of change in time in comparison with that of the second magnetomotive force generating means; and stopping the current flow in the coil during a valve opening hold period for which the valve opening position of the valve element is held by the magnetomotive force generated by the second magnetomotive force generating means.

Furthermore, a method of injecting fuel by opening/closing a fuel supply passage with a valve element of an electromagnetic fuel injection valve including first magnetomotive force generating means and second magnetomotive force generating means, which injection valve is driven by magnetomotive force generated by using the first magnetomotive force generating means and the second magnetomotive force generating means, the fuel supply passage being formed between the driven valve element and a valve seat to which the valve element is seated, the method comprising the steps of: generating a magnetomotive force by causing current to flow through at least one first coil and a second coil in a force direction in which the force generated in the coil and the force generated in the second means strengthen each other at an initial valve opening time at which the valve element is driven from a closed valve state to a valve opening state; raising the magnetomotive force in the first coil at a larger rate of change in time in comparison with the second coil; and stopping the current flowing in the first coil during a valve opening hold period for which a valve opening position of the valve element is held by the magnetomotive force generated by the second coil.

In the above method of injecting fuel, the pressure of fuel fed to the electromagnetic fuel injection valve is detected, and if the detected pressure is higher than in a usual state, the period for which current is caused to flow in the first coil is extended.

Moreover, in the above method of injecting fuel, the voltage applied to the first coil is detected, and if the detected voltage is lower than in a usual state, the period for which current is caused to flow in the first coil is extended.

The term "magnetomotive force" as used in reference to the above-mentioned electromagnetic fuel injection valve, fuel injection apparatus, and method of injecting fuel, refers to a force generating magnetic field, and if a coil is used for generating the magnetomotive force, the force is estimated by a value obtained by multiplying the number of turns N by the current I, that is, N·I. The above second magnetomotive force generating means has only to generate a magnetomotive force at a smaller rate of change in time in comparison with the first magnetomotive force generating means, and it includes means for generating an unchanged force, that is, a constant magnetomotive force, which may be provided by, for example, a permanent magnet or a coil in which a constant current continuously flows from a valve opening operation to a valve closing operation.

In accordance with the present invention, a first magnetomotive force generating means for generating a driving force for movement of a valve element from a closed valve state to a valve opening state with a short rise time, and a second magnetomotive force generating means for generating a driving force suitable to hold a valve opening state with a low power consumption, are independently provided. Therefore, it is possible to improve the performance of driving the valve element from a closing stage to an opening state, and reduction of the power consumption for holding a valve opening state, independently.

DETAILED DESCRIPTION OF THE EMBODIMENTS

Hereinafter, details of various embodiments according to the present invention will be explained with reference to the drawings.

Figure 20:
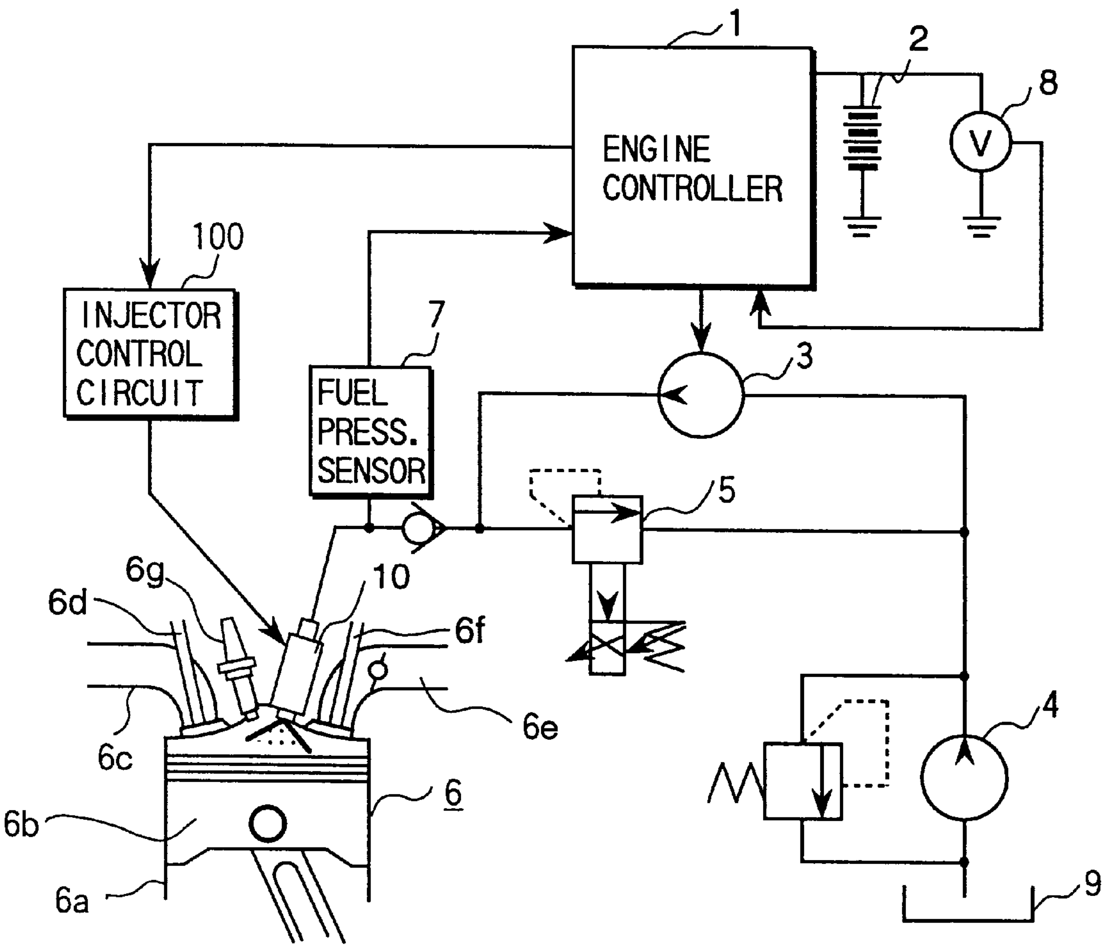
FIG. 20 in an overall schematic block diagram of an internal combustion engine representing an embodiment according to the present invention.

At first, an internal combustion engine according to the present invention will be explained with reference to FIG. 20. Fuel is fed from a tank 9 to a fuel pump 3 by a fuel feeding pump 4. Further, fuel is pressurized and fed to a fuel injection valve 10 via a check valve. An engine controller 1 controls a pressure regulator 5 and the fuel pump 3, based on a fuel pressure defected by a fuel pressure sensor 7, so that the fuel pressure is adjusted to a value preset corresponding to an operational state of a vehicle. The engine controller 1 determines an injection timing and an injection amount, and sends an injection signal to a fuel injection valve control circuit 100 (hereafter referred to as injector control circuit). The electromagnetic injection valve 10 injects fuel in response to the received injection signal. In this embodiment, the electromagnetic fuel injection valve 10 is provided at the upper part of an internal combustion body 6 together with an ignition plug 6*g,* and directly injects fuel into a cylinder 6*a.* Moreover, an air intake pipe 6*c,* an air intake valve 6*d,* an exhaust pipe 6*e,* and an exhaust valve 6*f* are provided at the upper part of the cylinder 6*a.* In the cylinder 6*a,* air intake and exhaust processes and a process of burning a mixture of fuel and air are performed according to motion of a piston 6*b.* Further, the engine controller 1 monitors the voltage of a battery 2 by using a voltage detector 8.

Figure 1A:
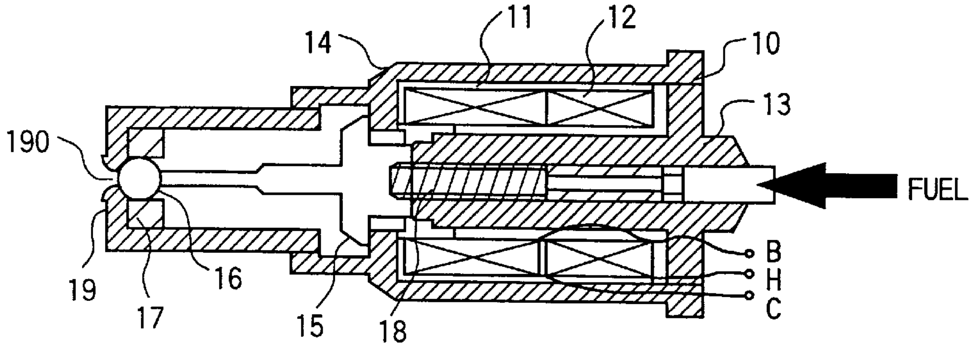
FIG. 1A and FIG. 1B are a vertical cross section of an electromagnetic fuel injection valve and a schematic diagram of wiring in a fuel injection apparatus using the valve, respectively, according to a first embodiment of the present invention.
Figure 1B:
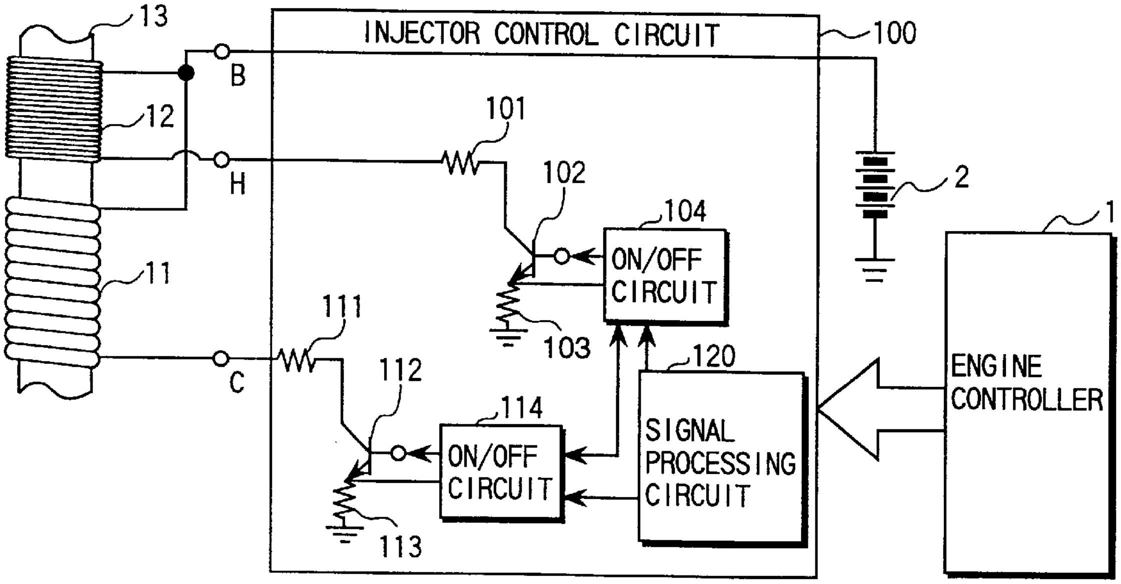

Next, an electromagnetic fuel injection valve and a fuel injection apparatus using the fuel injection valve of a first embodiment according to the present invention will be explained with reference to FIG. 1A and FIG. 1B. FIG. 1A is a vertical cross section of the electromagnetic fuel injection valve (hereafter, referred to as injector) shown in FIG. 20, and FIG. 1B is a schematic diagram of wiring in the fuel injection apparatus (injector 10 and injector control circuit 100).

At first, the structure of the injector will be explained by reference to FIG. 1A. The injector 10 to which pressurized fuel is fed from the fuel pump 3 performs a fuel injection from a fuel injection hole 190 by opening/closing a fuel supply passage between a ball valve 16, operating as a valve element, and a seat face (a valve seat face) 19 formed at the side of a yoke casing 14. The ball valve 16 is attached to one end of a plunger 15, and a swirler 17 for changing fuel to fine drops is provided in the vicinity of the seat face 19.

A control coil 11 and a hold coil 12 are provided to generate a force to drive the ball valve 16 in the injector 10. When current flows in these coils, a magnetic flux is generated and passes along a magnetic path in a magnetic circuit formed by a core 13, a yoke 14 and the plunger 15. Thus, a magnetic attraction force is generated between the plunger 15 on the one hand, and the core 13 and the yoke 14 on the other hand. By the generated magnetic attraction force, the plunger 15 with the ball valve 16 is displaced in a direction in which the ball valve 16 is moved away from the seat face 19, causing fuel to be injected into the cylinder 6a of the engine. Moreover, a return spring 18 in the form of a spring member is provided in the injector 10 in order to close the valve 10 by pressing the ball valve 16 toward the seat face 19 when the magnetic attraction force due to the control coil 11 and the hold coil 12 is not generated.

Two terminals in the respective control coil 11 and hold coil 12 are connected together and are used as a B terminal. The other terminal of the control coil 11 and the other terminal of the hold coil 12 are used as C and H terminals, respectively. Further, the manner of winding each coil, and the wiring between coils 11 and 12 and the battery 2, are set so that if a plus terminal of the battery 2 is connected to the B terminal, and a minus terminal of the battery 2 is connected to the C terminal and H terminal, magnetic flux is generated in the control coil 11 and the hold coil 12 in the same direction (the direction in which the magnetic flux in the control coil 11 and the magnetic flux in the hold coil 12 strengthen each other).

Next, the wiring in the injector control circuit 100 will be explained by using FIG. 1B. As to the injector 10, only the core 13, the control coil 11 and the hold coils 12 are illustrated in FIG. 1B.

To the injector control circuit 100, a battery voltage is fed from the battery 2, and by controlling the application of this voltage, the control circuit 100 controls current flowing in the control coil 11 and the hold coil 12, based on an injection signal sent from the engine controller 1. In the injector control circuit 100, a transistor ON/OFF circuit 104 for the hold coil 11 and a transistor ON/OFF circuit 114 for the control coil 12 are provided to control current flowing to the control coil 11 and the hold coil 12, respectively. The transistor ON/OFF circuits 104 and 114 commonly possess information on current flowing in the respective coils 12 and 11, which currents are detected by using a hold coil current detection resistor 103 and a control coil current detection resistor 113, and input coil current control signals are applied to a power transistor 102 for the hold coil 11 and to a power transistor 112 for the control coil 12, respectively, in response to output signals from a signal processing circuit 120, which are generated, based on the injection signal sent from the engine controller 1 and the commonly possessed current information. If each of the power transistor 102 for the hold coil 11 and the power transistor 112 for the control coil 12 is turned on, the battery voltage from the battery 2 is applied to each of the hold coil 12 and the control coil 11. Numerals 101 and 111 indicate the equivalent internal resistance of the hold coil 12, and its drive circuit, and the equivalent internal resistance of the control coil 11, and its drive circuit, respectively.

The control coil 11 and the hold coil 12 possess different electromagnetic characteristics. This is provided because the respective coils 11 and 12 perform different roles at each of the operational stages of valve closing, valve opening, valve open hold, and valve closing. In the first embodiment, the control coil 11 is used exclusively at an initial period in valve opening, and the hold coil 12 is used during the valve open hold period. Operations of each coil will be explained in the following.

Electromagnetic characteristics required for the coils 11 and 12 at the time of valve opening operations are as follows. Since the pressing load of the return spring 18 and the pressure of pressurized fuel is applied against the ball valve 16, it is required for the coils 11 and 12 to generate a larger electromagnetic attraction force at the time of valve opening operations in comparison with that required during the valve open hold period. Therefore, when an electromagnetic attraction force generated by the coils 11 and 12 increases beyond a sum of the pressing load of the spring 18 and the fuel pressure, the plunger 15 begins to move. Thus, since the rise time of the electromagnetic attraction force effects a delay in valve opening, it is necessary to make the rise time as short as possible.

Figure 2A:
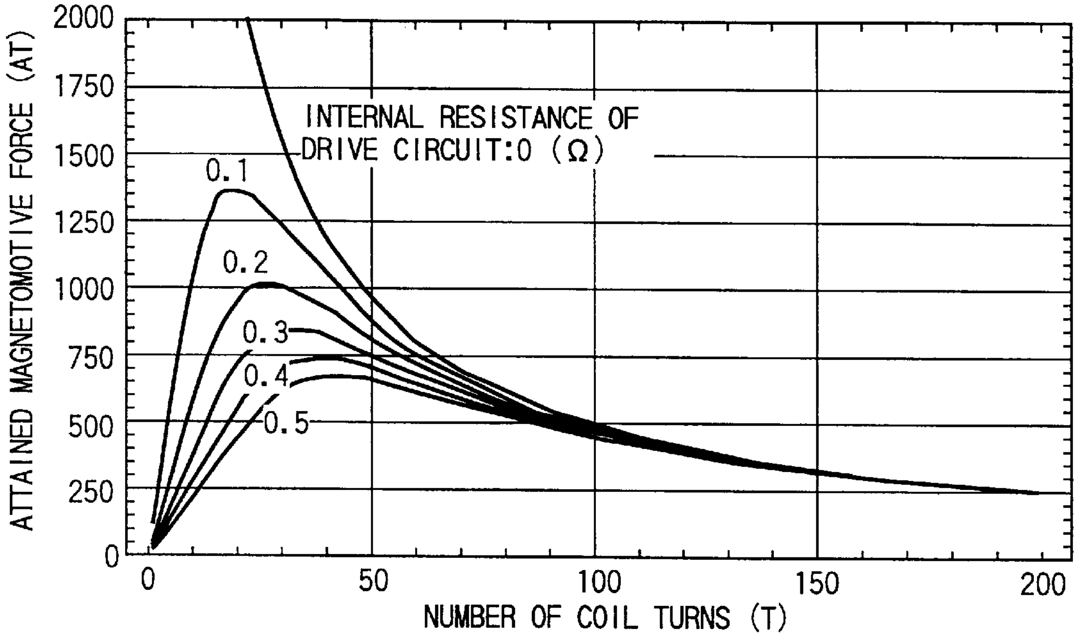
FIG. 2A and FIG. 2B are graphs which show a relation between the number of coil turns and the magnetomotive force which is attained, and a relation between the number of coil turns and coil current, respectively, using the internal resistance of a drive circuit as a parameter, the attained magnetomotive force and the coil currents being values which occur at a short time after the voltage is applied to the coil from a battery.
Figure 2B:
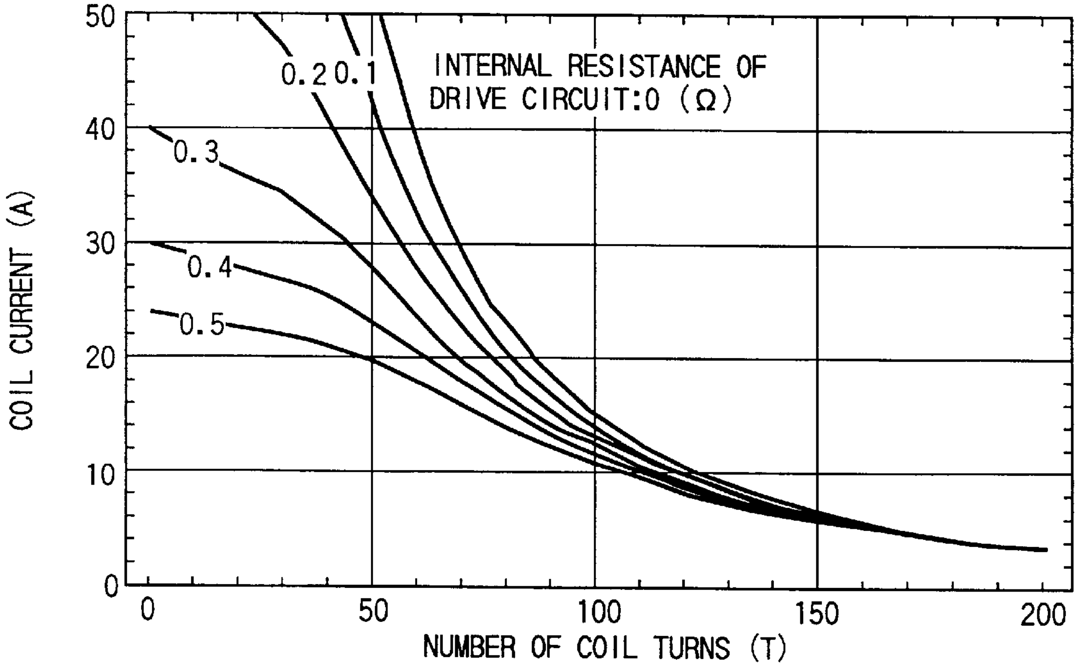

FIG. 2A shows a relation between the number of coil turns N (T) and the attained magnetomotive force U (AT), using the internal resistance as a variable, in which the attained magnetomotive force is a force value attained for a short time At after the battery voltage is applied to a coil from the battery, where Δt is approximately a half of a delay in valve opening in a usual injector for a direct injection engine (usually 0.1–0.5 ms). Further, FIG. 2B shows a relation between the number of coil turns N (T) and the attained coil current I (A), using the internal resistance as a variable, in which the attained magnetomotive force is a force value attained for a short time At after the battery voltage is applied to the coil from the battery.

Magnetomotive force is expressed by the value U (=NI) obtained by multiplying the number of coil turns N (T) by the current I (A) flowing in a coil, and it can be used to evaluate the electromagnetic attraction force which can be attained for the short time Δt. If the internal resistance is 0, an inductance component and a resistance component decrease, and a large current flows in a coil, as the number of coil turns decreases. Consequently, the electromagnetic attraction force which can be attained for the short time Δt increases. The reason for this is that, although the magnetomotive force decreases as the number of coil turns decreases, since the inductance of a coil is proportional to the square of the number N of coil turns, the effects of an increase in current due to a decrease in the inductance of the coil becomes larger in comparison with a decrease in the magnetomotive force which occurs due to a decrease in the number of coil turns. That is, in order to obtain a large electromagnetic force by driving a coil with a low voltage, such as a battery voltage, it is preferable for improving the response of valve opening to increase the magnetomotive force by increasing the coil current rather than increasing the number of coil turns. However, since each drive circuit actually has some internal resistance, the maximum value of the attained magnetomotive force is restricted as shown in FIG. 2A, and the optimal number of coil turns changes according to the internal resistance of the drive circuit.

Further, the impedance to current flow is affected by not only the resistance and the inductance of the coils in an injector, but also by the internal resistance of the control circuit, the resistance in switching devices, and a decrease in the battery voltage. Therefore, it is necessary to reduce the internal resistance in the control circuit and the resistance in the switching devices to as low a value as possible, and to suppress the decrease of a battery voltage as much as possible.

Based on the electromagnetic characteristics of a coil as shown in FIG. 2A, a coil used mainly at the time of initial valve opening, that is, the control coil 11 of this embodiment, and the power transistor 112, are composed as follows. First of all, a wire of a large diameter is used for the control coil 11. Further, by using a bipolar transistor, a CMOS transistor, or a bi-CMOS transistor, for the power transistor 112, the ON resistance of the power transistor 112 at a current flowing state is reduced, and, the equivalent internal resistance 111 also is reduced. Furthermore, according to the value of the internal resistance 111 determined by the above-mentioned circuit composition, the number of turns of the control coil 11 is determined approximately as a value capable of causing the maximum attained magnetomotive force. For example, assuming that the internal resistance of the drive circuit is 0.2 Ω, it is desirable to set the number of turns to 30 T (turns).

If a wire of a smaller resistivity can be used, the diameter of the wire used for the control coil 11 can be naturally decreased. By using the control coil 11 having a number of turns as determined above, it is possible to realize a control coil 11 of which the rate of magnetomotive force change with time is large, that is, one in which the rising response is excellent. Thus, this realized excellent response can reduce the time required for valve opening.

Figure 3A:
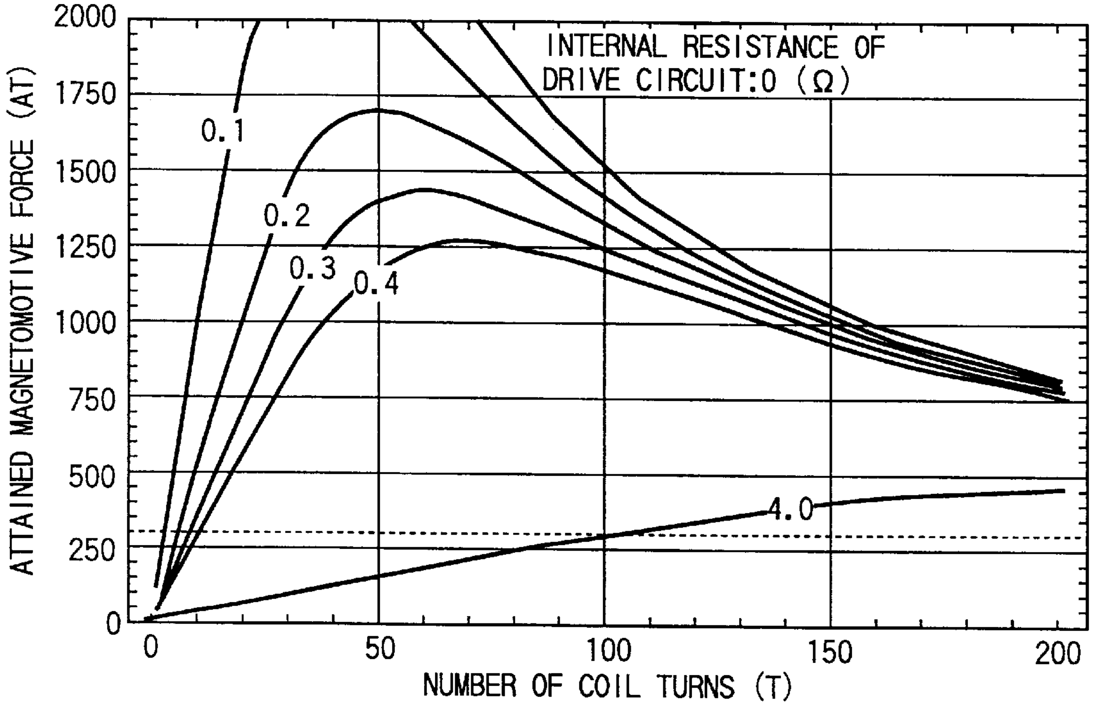
FIG. 3A and FIG. 3B are graphs which show a relation between the number of coil turns and the magnetomotive force which is attained, and a relation between the number of coil turns and coil current, respectively, using the internal resistance of a drive circuit as a parameter, the attained magnetomotive force and the coil currents being valued at the end of a standard valve opening demand time period.
Figure 3B:
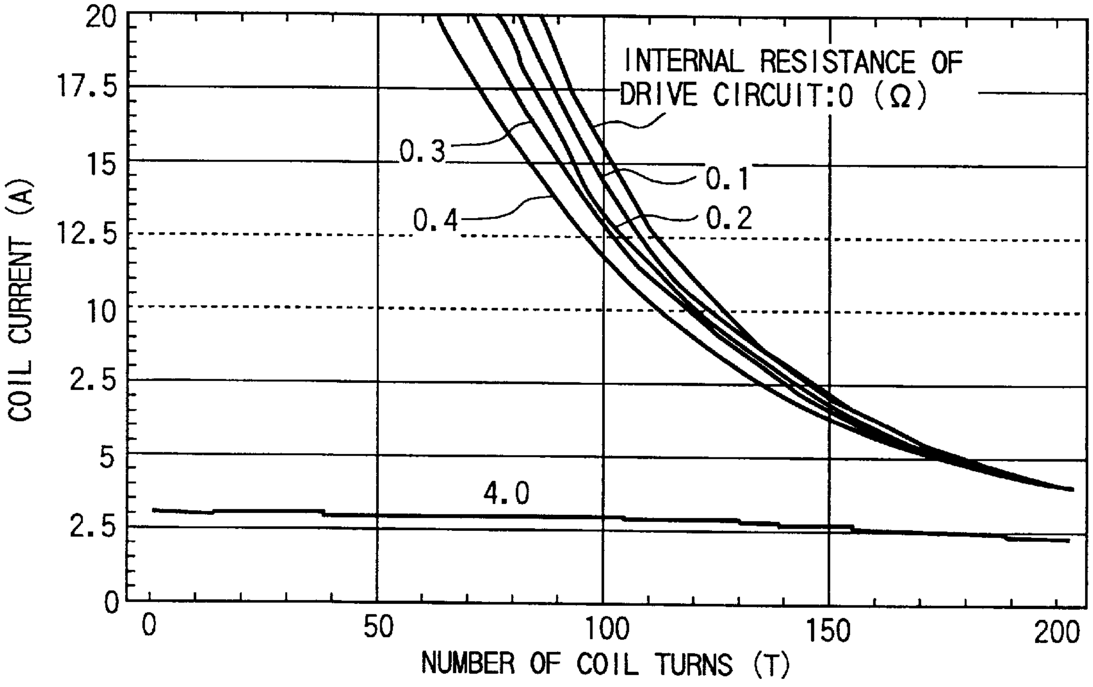
Figure 4A:
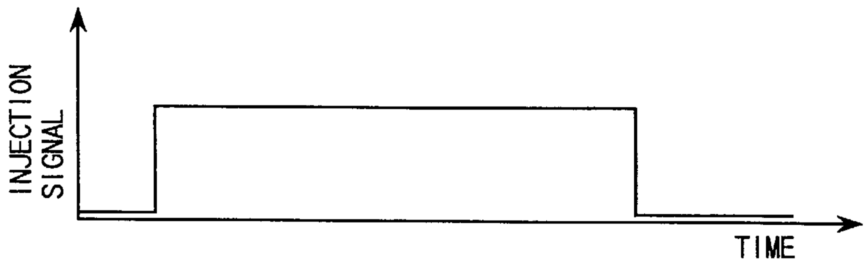
FIG. 4A–FIG. 4F are diagrams which show changes of the voltage and current in a control coil and a hold coil, corresponding to an injection signal output from an engine controller of the first embodiment according to the present invention.
Figure 4B:
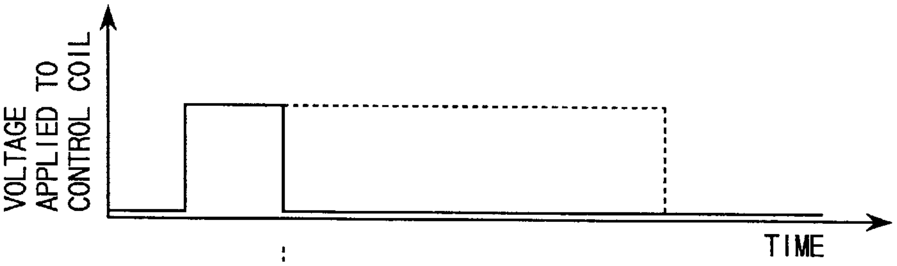
Figure 4C:
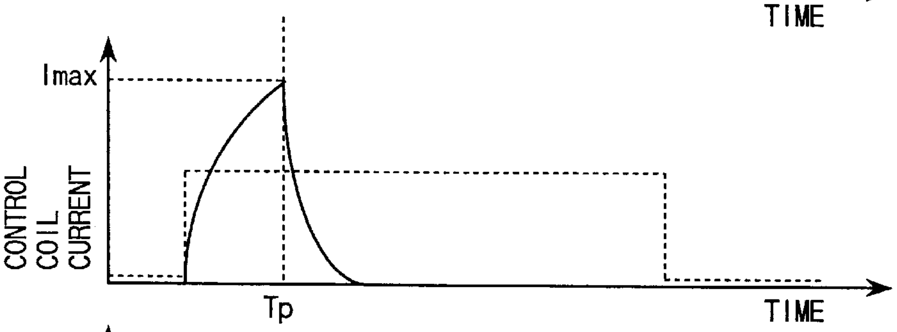
Figure 4D:
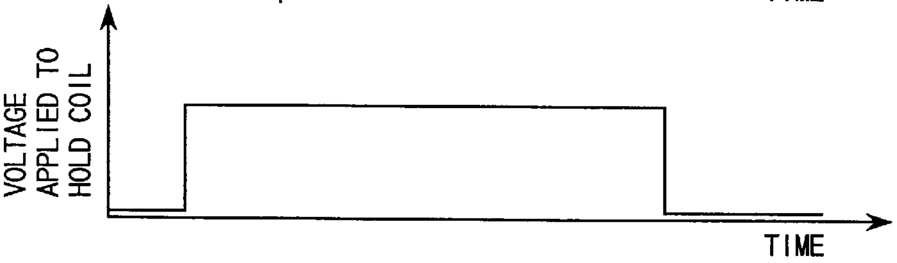
Figure 4E:
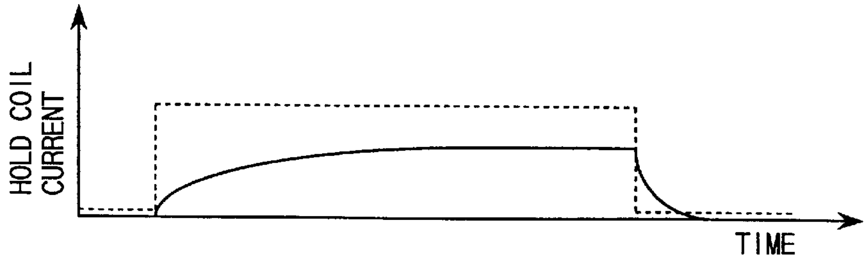
Figure 4F:
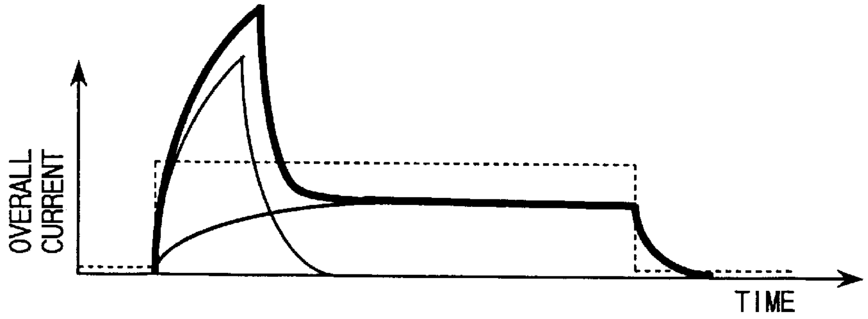
Figures 5A, 5B, 5C, 5D, 5E, 5F:
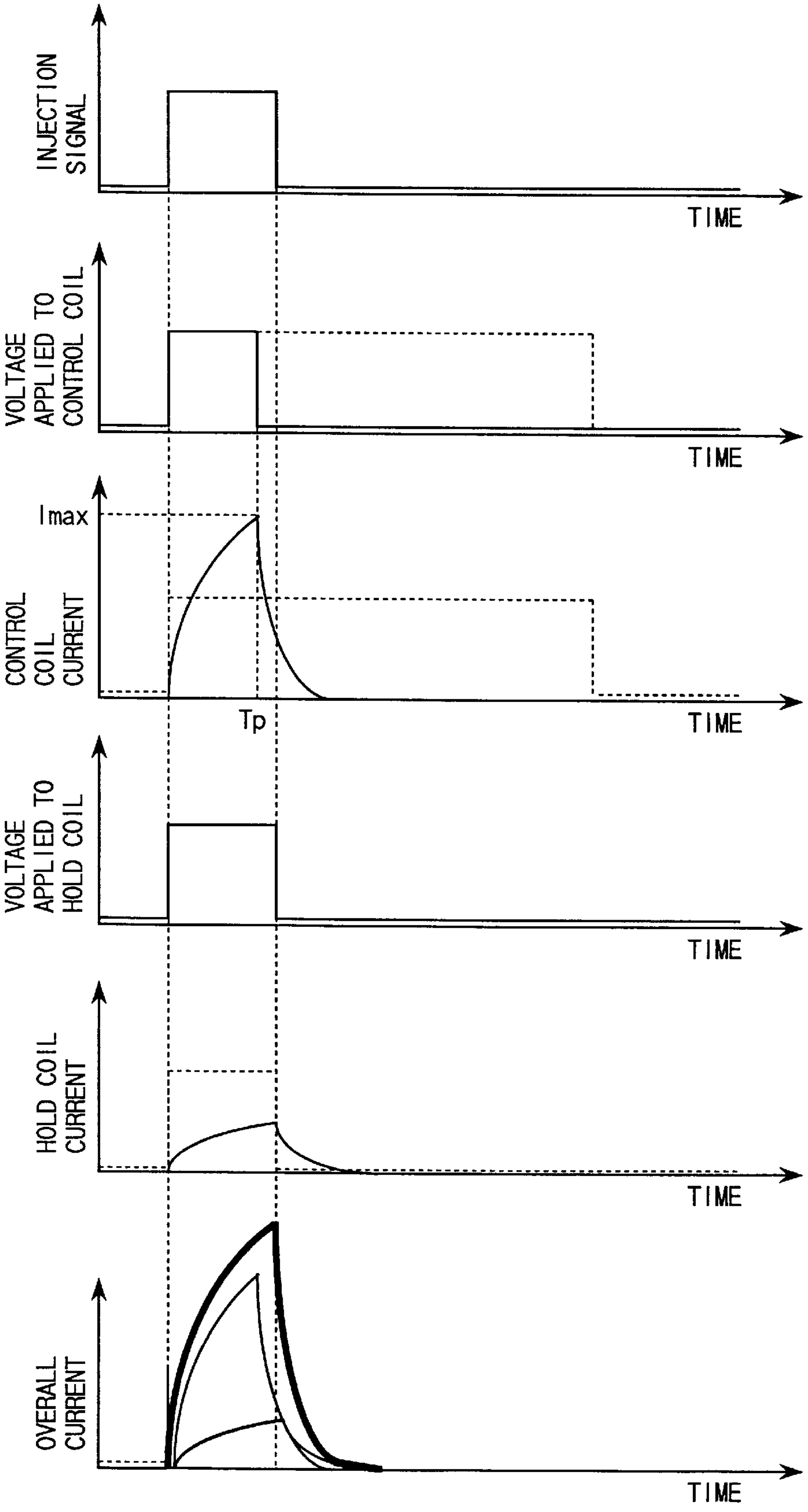
FIG. 5A–FIG. 5F are diagrams similar to those shown in FIG. 4A–FIG. 4F, corresponding to an injection signal of a short time width.

Next, the electromagnetic characteristics necessary for the hold coil 12 during the valve open hold period will be explained below. FIG. 3A shows a relation between the number of coil turns N (T) and the attained magnetomotive force U (AT), by using the internal resistance of a drive circuit as a variable, and in which the attained magnetomotive force is a force value attained for a definite time Th after the battery voltage is applied to the coil from a battery, where Th is the standard time width of a valve opening demand for a usual injector for a direct injection engine (usually about 1 ms). Further, FIG. 3B shows a relation between the number of coil turns N (T) and the attained coil current I (A), using the internal resistance of a drive circuit as a variable, in which the coil current force is a current value attained for the definite time Th after the battery voltage is applied to the coil from a battery.

Usually, the valve opening state can be held by smaller magnetomotive force in valve open hold operations in comparison with valve opening operations. In this regard, since fuel is injected after the valve opening, at which time the pressure balances upstream and downstream of the ball valve 16, the pressing force due to the fuel pressure decreases. Moreover, since the air gap between the plunger 15 on the one hand, and the core 13 and the yoke 14 on the other hand, decreases, the magnetic flux density at the air gap increases, and so the generated magnetomotive force can be more effectively used. Further, during valve closing operations, the magnetomotive force generated during the valve open hold period decays in response to interruption of the voltage to the hold coil 12, that is, the electromagnetic force decays. Furthermore, when the electromagnetic force decreases below the pressing load of the return spring 18, the valve begins to close. If the magnetomotive force generated during the valve open hold period is too large, it causes a larger delay in valve closing. Therefore, it is necessary to hold the valve during the valve open hold period with a low magnetomotive force which is near to the limit force necessary to hold the valve open.

For example, assuming that the magnetomotive force necessary during the valve open hold period is 300 AT, if the number of turns of the hold coil 12 is more than 10 T and less than 200 T for an internal resistance of 0.4 Ω in the drive circuit, the magnetomotive force becomes far larger than the necessary magnetomotive force. As shown in FIG. 3B, since the coil current is far beyond 20 A if the number of turns is less than 100 T, maintaining a current flow of 20 A in the hold coil 12 during the valve open hold period causes a burning up of the coil 12. Therefore, a number of turns of less than 100 T is not practical. On the other hand, if a number of turns is more than 200 T, since the current flowing in the hold coil 12 does not decreases rapidly even if the voltage applied to the hold coil 12 is interrupted, because of a large inductance, the delay in valve closing becomes large.

As shown in FIG. 3A, if the internal resistance of the drive circuit is about 4 Ω, a magnetomotive force corresponding to the turn number of about 100 T is 300 AT. Further, this combination of 100 turns and 4 Ω of internal resistance results in a current flow of about 3 A in the hold coil 12, and this current value is reasonable.

Based on the coil performance shown in FIG. 3A and FIG. 3B, a coil used mainly during the valve open hold period, that is, the hold coil 11 of this embodiment, and the power transistor 102, are composed as follows. At first, it is not necessary to use a wire of an especially small diameter for the wire used for the hold coil 12, and so the diameter of the wire can be selected by merely taking into consideration the space factor in the injector, as required for the hold coil 12. Further, it is necessary to reduce the ON resistance of the power transistor 102 especially, and if the sum of the ON resistance and the resistance of the hold coil 12 is not sufficient, a current limitation resistor is added to the resistance of the hold coil. Furthermore, corresponding depending on the resistance of the hold coil 12, which is determined as mentioned above, the number of turns necessary to hold a valve open state is also determined. By determining the number of turns of the hold coil 12, as mentioned above, it is possible to compose the hold coil 12 in which the rate of magnetomotive force change with time at the time of valve opening operations is smaller then that in the control coil 11. Thus, it is possible to reduce the current flowing in the hold coil 11 during the valve open hold period, as well as the elapsed time to close the valve.

That is, during the valve open hold period, it is desirable to use the current saturation characteristics of a coil, which is used in a saturated method in which a current control circuit is not necessary. In this coil, since the number of turns is large, the power consumed to hold the valve open is small.

As mentioned above, since the electromagnetic characteristics required for a coil at the time of valve opening operations is contrary to those required for a coil during the valve open hold period, and so it is very difficult to realize a single coil and drive circuit capable of satisfying the above-explained two types of electromagnetic characteristics. It may be possible to realize such a coil and its drive circuit by applying a high voltage to a coil having a small number of turns and controlling the coil by using a complicated current control method. However, this approach is impossible if a low voltage, such as a battery voltage has to be used, and if it is necessary to control the coil by a simple and cheap control circuit.

In this embodiment, a coil having the electromagnetic characteristics required for valve opening operations is used as the control coil 11, and a coil having the electromagnetic characteristics required during the valve open hold period is used as the hold coil 12. Thus, by simply switching to the coil in which current is to flow, from the control coil 11 to the hold coil 12, an ideal operational performance of the fuel injection valve can be realized at each of the stages of fuel injection operations.

Furthermore, in arranging the control coil 11 and the hold coil 12 relative to the core 13 and the yoke 14, it is desirable to arrange the control coil 11 nearer to the plunger 15. In this regard, since the maximum density of magnetic flux occurs in the vicinity of a coil in the magnetic circuit composed of the core 13, the yoke 14, and the plunger 15, it is effective to arrange the control coil 11 into which a large current is rapidly input at an initial period of valve opening operations near to the plunger 15.

In the following, a method of driving the injector 10 using the injector control circuit 100 of the first embodiment will be explained. The driving method explained below is for a usual operation state without a decrease of a coil driving voltage, an increase of the resistance due to an increase in coil temperature, an increase in the pressing force against the valve element, which is caused by an increase in the fuel pressure, and so forth. Further, under the conditions wherein a constant fuel pressure control is performed and a voltage increase method is adopted for the voltage drive method, and wherein the coils are driven with little voltage disturbance, this driving method is sufficiently effective.

FIG. 4A–FIG. 4F show changes of the voltage and current in the control coil 11 and the hold coil 12, corresponding to an injection signal output from the engine controller 1 of the first embodiment according to the present invention. If the injection signal is inputted to the injector control circuit 100, a control coil controlling signal and a hold coil controlling signal are outputted from the injector control circuit 100. Further, the power transistor 112 for the control coil 11 and the power transistor 102 for the hold coil 12 are turned on, and the voltage from the battery 2 is applied to the control coil 11 and to the hold coil 12. Thus, current flows in the control coil 11 and in the hold coil 12, and a magnetic flux is generated.

Since the rate of magnetomotive force change with time is large in the control coil, as mentioned above, the current flowing in the control coil 11 rises more rapidly than that in the hold coil 12. Moreover, since a current flows in the two coils, a large magnetomotive force can be totally obtained at the initial period of valve opening operations. Therefore, a magnetic attraction force generated in the valve opening direction acts on the plunger 15 at an early period, and it is possible to reduce the interval between the start of application of the voltage to the coils and the time at which the magnetic attraction force exceeds the sum of the fuel pressure and the set load of the return spring 18, which reduces the time delay in valve opening.

As mentioned above, in the control coil 11, since the rate of magnetomotive force change with time is large and its internal resistance is small, if the current is allowed to flow continuously in the control coil 11 after the valve is opened, an over-current will flow in the coil 11, and there is the possibility that the coil 11 will be burned up. Further, since it is not necessary to generate a stronger magnetic attraction force than is needed, and since a stronger magnetic attraction force contrarily causes a large delay in valve closing, when the valve is in the valve open hold state, after the valve is opened, the current flowing in the control coil 11 should be stopped.

In establishing the proper timing for stopping the flow of current, the signal processing circuit 120 counts the time which has elapsed from the start of valve opening, and when the elapsed time reaches a preset time Tp, the circuit 120 sends an OFF signal to the power transistor 112 for the control coil 11. As another way of performing this control, if current flowing in the control coil 11, which is detected as a voltage decrease at the control current detection resistor 113, arrives at a preset current value Imax, the circuit 120 also sends an OFF signal to the power transistor 112 for the control coil 11. Moreover, it is possible to stop current flowing in the control coil 11 by adding a current stopping timing instruction signal to the injection signal outputted from the engine controller 1 and sending the modified injection signal to the signal processing circuit 100, which further processes the modified injection signal and outputs an OFF signal at the indicated current stop timing.

As will be explained later, in order to accommodate disturbances such as a decrease in the coil driving voltage, an increase in the internal resistance due to an increase in coil temperature, an increase in the force pressing on the valve element resulting from an increase in the fuel pressure, etc., the last-mentioned current stop timing determination method is adopted.

On the other hand, current continues to flow in the hold coil 12 during the valve open hold state. Since the total internal resistance of the hold coil 12 and its control circuit is large, as explained above, current flowing in the hold coil 12 is restricted, and so a current necessary and sufficient to hold the valve open must be supplied to the hold coil 12. Thus, it is possible to set a small magnetomotive force for the hold coil 12 since the major part of the magnetomotive force necessary for opening the valve needs to be generated only at the initial period of valve opening operations by the control coil 11.

Further, application of a voltage to the hold coil 12 is stopped at the trailing edge of the injection signal outputted from the engine controller 1. Since only a necessary and sufficient current flows in the hold coil 12, the current decays quickly, and the magnetic flux acting on the plunger 15 also will decay quickly, which can reduce any delay in valve closing.

In this embodiment, since two kinds of coils, each of which has the respective electromagnetic characteristics required at each valve operation stage, are used, it is possible to realize an ideal rising-up or trailing-off performance of valve operations without the need to apply a high voltage to the coils or use a complicated control circuit. Furthermore, it is possible to attain a wide dynamic range in the operation of an injector, which results in a high performance.

To widen the dynamic range, it is necessary to decrease the minimum injection amount to as low a value as possible. The injection amount is controlled by the ON time width of the injection signal, and the ON time width is decreased to a short width necessary to generate the minimum injection amount. Although a delay in valve opening or closing should be reduced to correspond to the short ON time width, if the first embodiment is applied to a valve operation corresponding to an injection signal of very short ON time width, the phenomena shown in FIG. 5A–FIG. 5F may possibly occur.

Although the current flowing in the control coil 11 is stopped at Tp, current flow in the hold coil 12 is continued beyond Tp until the injection signal trails off, which represents a valve closing demand. At the start of valve closing, since the magnetic flux trails off more quickly as the current flowing in each of the coils 11 and 12 becomes smaller, a smaller current flowing in the coils 11 and 12 is more effective to reduce a delay in valve closing. since the decay rate of the magnetomotive force is smaller in the hold coil 12 than in the control coil 11, it is especially desirable to adjust the current flowing in the hold coil 12 to as low a value as will satisfy a minimum requirement.

The above-mentioned subject of expanding the dynamic range can be solved by adjusting the electromagnetic characteristics of the control coil 11 and by using a method of controlling current flow in the hold coil 12, of which an example is shown in FIG. 6A–FIG. 6F.

Figures 6A, 6B, 6C, 6D, 6E, 6F:
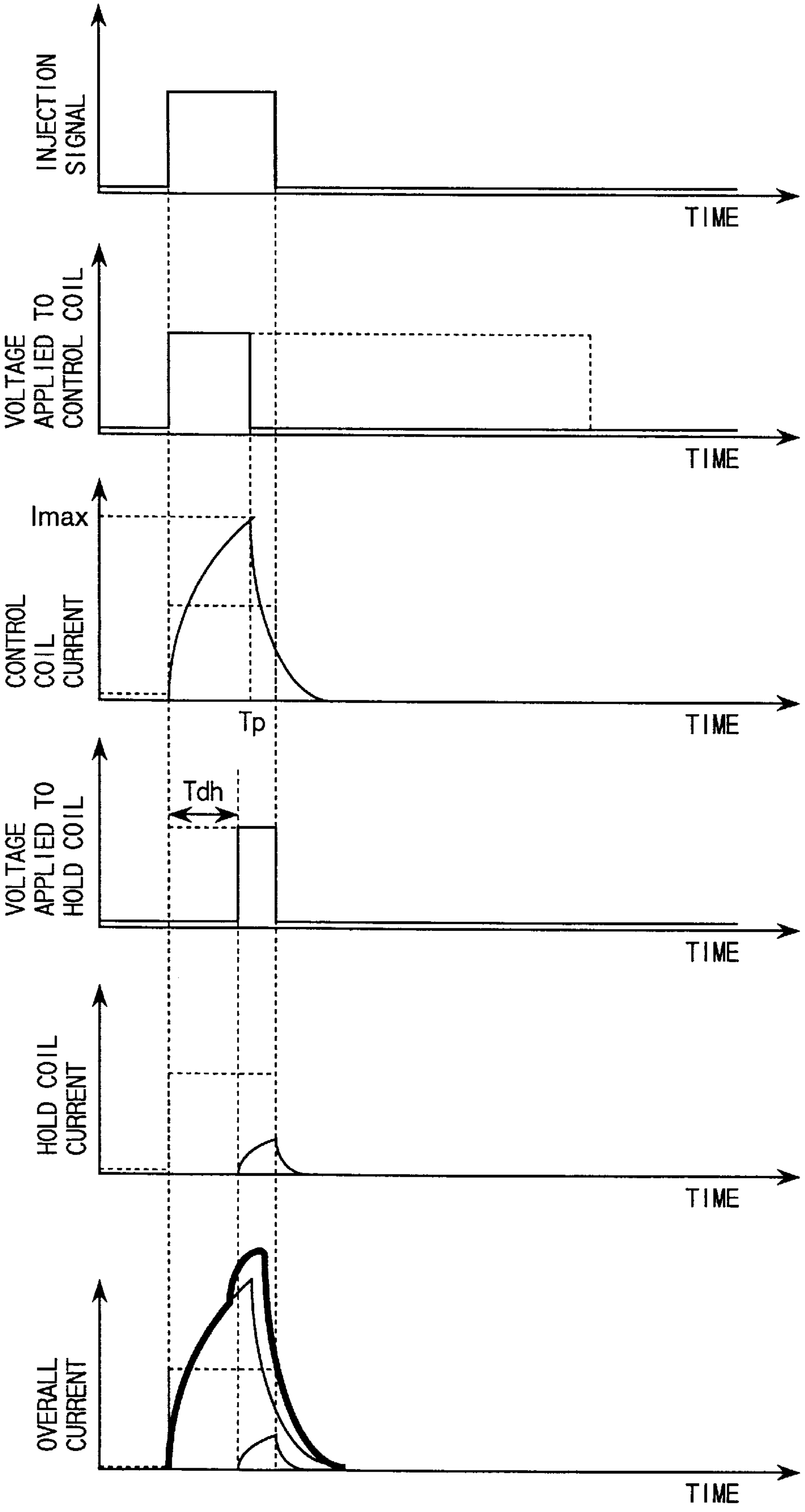
FIG. 6A–FIG. 6F are diagrams similar to those shown in FIG. 5A–FIG. 5F, in the case where current flows in the hold coil with a preset time delay.

That is, the electromagnetic characteristics of the hold coil 12 are determined so that a sum of the magnetomotive force in the control coil 11 and that in the hold coil 12, which forces are attained for a short time after applying the voltage to the coil 11, is enough to open the valve. As shown in FIG. 6D–6F, it is not necessary to start current flowing in the hold coil 12 at the same time as receipt of the injection signal, and so it is effective to delay the start of current flow in the hold coil 12 by Tdh, which can reduce the level of overall current attained, before current flowing in the control coil 12 begins to decay, to a lower value in comparison with the case in which current flow in the hold coil 12 is started at the same time as receipt of the injection signal. As mentioned above, by delaying the start of current flow in the hold coil 12, it is possible to reduce the level of the overall current at the trailing edge of the injection signal, in other words, at the time at which valve closing is demanded. Thus, a delay in valve closing can be reduced.

Figure 7A:
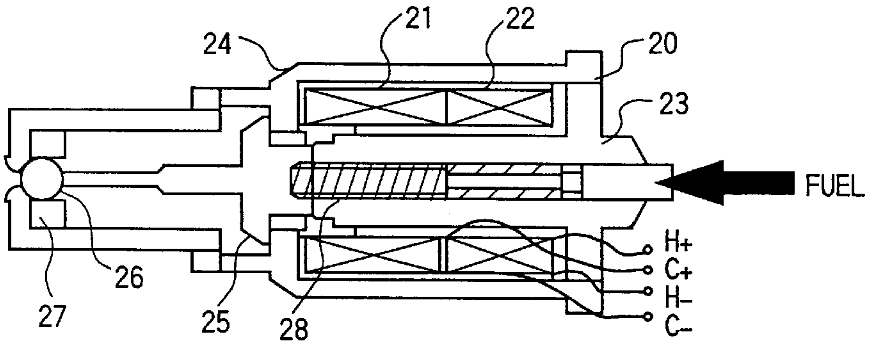
FIG. 7A and FIG. 7B are a vertical cross section of an electromagnetic fuel injection valve and a schematic diagram of wiring in a fuel injection apparatus using the valve, respectively, according to a second embodiment of the present invention.

In the following, a second embodiment according to the present invention will be explained. FIG. 7A shows a vertical cross section of an injector 20 of the second embodiment, and FIG. 7B shows a schematic block diagram of wiring for the injector 20 and an injector control circuit 200 for controlling the injector 20.

As between the injector 20 of the second embodiment and the injector 10 of the first embodiment, only the wiring is a little different, and the electromagnetic characteristics of the control coil and the hold coil are the same. Therefore, the performance of the injector 20 is similar to that of the injector 10 of the first embodiment.

One terminal and the other terminal of the control coil 21 are denoted as C+ and C−, and one terminal and the other terminal of the hold coil 22 are denoted as H+ and H−. Further, the manner of winding each coil and the wiring among the coils 21 and 22, and the battery 2, are set so that if a plus terminal of the battery 2 is connected to each (+) terminal of the coils, and a minus terminal of the battery 2 is connected to each (−) terminal of the coils, magnetic flux is generated in the control coil 21 and the hold coil 22 in the same direction.

Figure 7B:
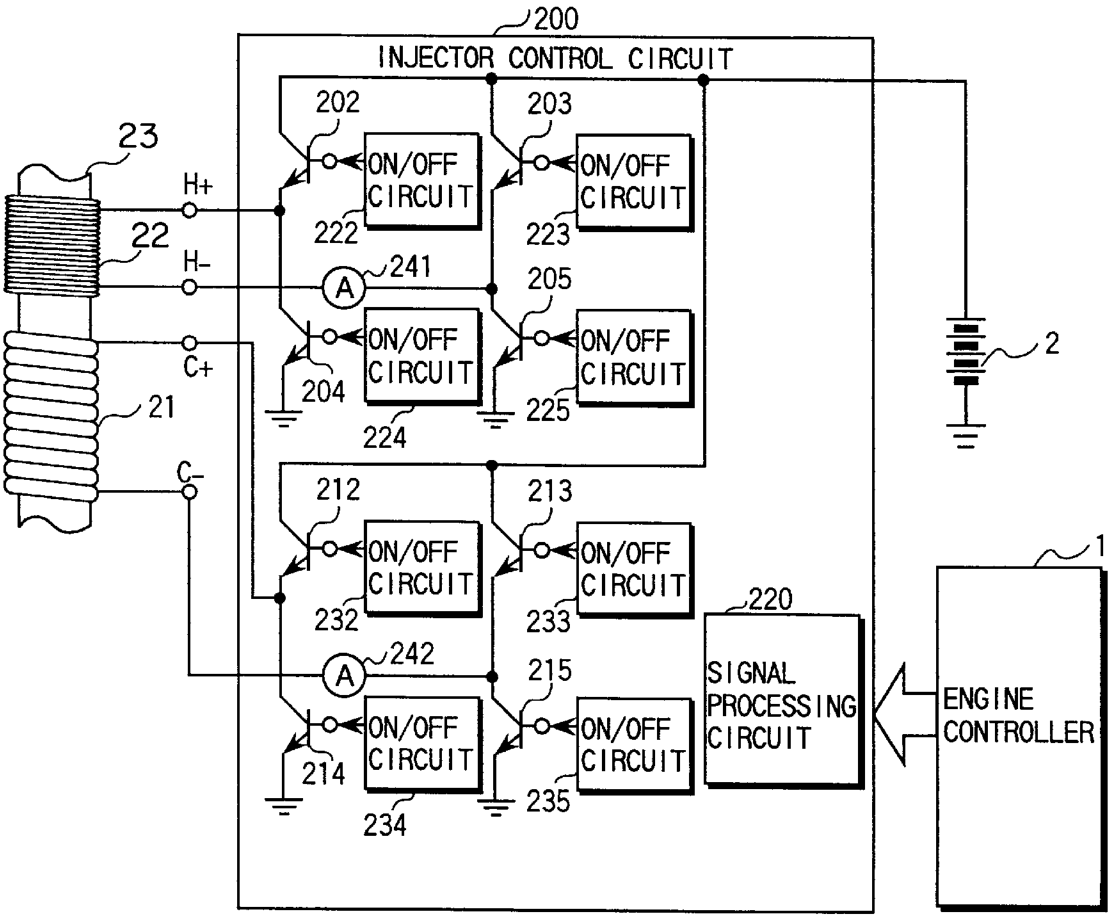

In FIG. 7B, of the various elements of the injector 20, only a core 23, a control coil 21, and a hold coil 22, are shown.

To the injector control circuit 200, a battery voltage is fed from the battery 2, and by controlling the application of this voltage, the control circuit 200 controls current flowing in the control coil 21 and the hold coil 22, based on an injection signal sent from the engine controller 1. In the injector control circuit 200, transistor ON/OFF circuits 222–225 for the hold coil 22 and transistor ON/OFF circuits 232–235 for the control coil 22 are provided to control current flowing in the hold coil 22 and the control coil 21, respectively. Each transistor ON/OFF circuit commonly possesses information on current flowing in the coil 22 and current flowing in the coil 21, which are detected by using a hold coil current detection resistor 241 and a control coil current detection resistor 242, respectively. Further, each transistor ON/OFF circuit inputs a coil current control signal to a corresponding one of the power transistors 202–205 for the hold coil 21 and power transistors 212–215 for the control coil 12, in response to output signals from a signal processing circuit 220, which are generated based on the injection signal sent from the engine controller 1 and the commonly possessed current information (for simple illustration, wiring among the current detection resistors, the transistor ON/OFF circuits, and the signal processing circuit 220, is omitted).

By using the above-mentioned circuit and wiring, it is possible to apply any one of a voltage in a valve opening direction and an inverse voltage in the direction reverse to the valve opening direction, to any one of the control coil 21 and the hold coil 22. For example, as to the hold coil 22, if the power transistors 202 and 205 for the hold coil 22 are turned on, the H+ terminal will be connected to the plus terminal of the battery 2, and the H− terminal will be connected to the minus terminal of the battery 2. Consequently, current flows from the H+ terminal to the H− terminal. On the contrary, if the power transistors 203 and 204 for the hold coil 22 are turned on, the H− terminal will be connected to the minus terminal of the battery 2, and the H+ terminal will be connected to the plus terminal of the battery 2. Thus, current flows in a direction reverse to that in the former case.

A control of the current flow direction in the control coil 21 can be carried out similarly to the above-mentioned method of control for the hold coil 22.

When current flows from the H+ terminal to the H− terminal through the coil 22, if the power transistors 203 and 204 for the hold coil 22 are turned on, an inverse voltage which forcibly decays the current flow will be applied to the hold coil 22. A similar operation to the above-mentioned operation for the hold coil 22 can be performed for the control coil 21. By using the injector control circuit 200 of the second embodiment according to the present invention, it is possible to cause a rapid decay of the current flowing in each of the control coil 21 and the hold coil 22 by applying an inverse voltage to each coil, which also rapidly decays magnetic flux generated in each coil. Thus, this embodiment is very effective to reduce a delay in valve closing.

The control coil 21 and the hold coil 22 are surrounded by the core 23 and the yoke 24. A magnetic attraction force attracting the plunger 15 is generated by the magnetic flux passing through a magnetic path in a magnetic circuit composed of the core 23, the yoke 24, and the plunger 15. If the (+) terminals of the coils 21 and 22 are connected to the plus terminal of the battery 2, and the (−) terminals of the coils 21 and 22 are connected to the minus terminal of the battery 2, a magnetic flux is generated in the same direction in the coils 21 and 22, and the magnetic flux generated in the control coil 21 and the magnetic flux generated in the hold coil 22 strengthen each other.

On the other hand, for example, if the (−) terminal of the coil 21 is connected to the plus terminal of the battery 2, and the (+) terminal of the coil 22 is connected to the minus terminal of the battery 2, magnetic flux generated in the control coil 21 has the opposite direction relative to that of the magnetic flux generated in the hold coil 22, and so it weakens the magnetic flux generated in the hold coil 22.

For example, in order to obtain rapid decay of the electromagnetic force generated by the hold coil 22 in response to a valve closing demand, the overall magnetic flux may be caused to rapidly decay by applying an inverse voltage to the control coil 21 to generate magnetic flux in the reverse direction. This method is particularly effective to reduce a delay in valve closing.

In the following, a method of driving the injector 20 using the injector control circuit 200, to which the above-mentioned current control method is applied, will be explained with reference to FIG. 8A–FIG. 8F, which show operational states of the control coil 21 and the hold coil 22, corresponding to the injection signal outputted from the engine controller 1. When the injection signal is inputted to the injector control circuit 200, the injector control circuit 200 controls the transistor ON/OFF circuits 222–225 for the hold coil 22 and the transistor ON/OFF circuits 232–235 for the control coil 21 so that current flows in the coils 21 and 22 so as to generate a magnetic flux in the same direction in both the coils 21 and 22. In this case, the power transistors 202, 205, 212, and 215, are turned on.

Current flowing in the control coil 21 is stopped by turning off one or both of the power transistors 212 and 215 for the control coil 21, based on a preset value of Imax or Tp, similar in the first embodiment. Although the power transistors 212 and 215 for the control coil 21 are turned off by the transistor ON/OFF circuits for the control coil 21 in this example, it is possible for the engine controller 1 to directly turn off these power transistors.

Figures 8A, 8B, 8C, 8D, 8E, 8F:
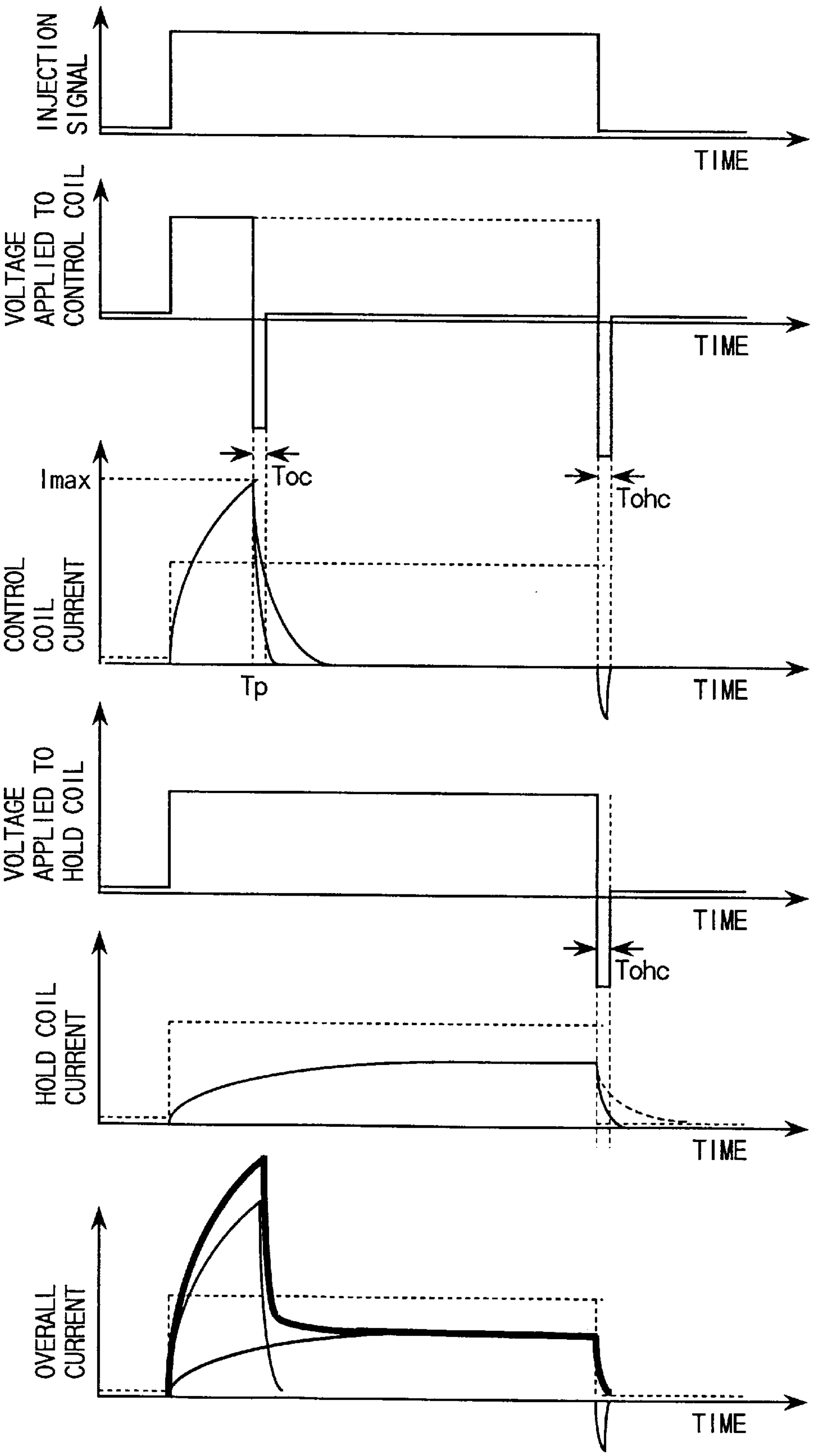
FIG. 8A–FIG. 8F are diagrams which show changes of the voltage and current in a control coil and a hold coil, corresponding to an injection signal output from an engine controller of the second embodiment according to the present invention.

In the second embodiment, the power transistors 213 and 214 for the control coil 21 are turned on for a short period Toc as shown in FIG. 8B. Consequently, a voltage in a direction opposite to that in which current has been flowing to this time point in the control coil 21 is applied to the control coil 21, and so the current flowing in the control coil 21 decays rapidly. By adequately setting the width of Toc, it is possible to force the current flowing in the control coil to 0. It is also possible to change Toc in response to an instruction signal outputted from the engine controller 1.

Also, according to the trailing edge of the injection signal, in other words, the valve closing demand, the power transistors 203 and 204 for the hold coil 22 are turned on for the short period Toh at the same time the power transistors 202 and 205 for the hold coil 22 are turned off in order to apply a inverse voltage to the coil 22 for the period Toh. Thereby, the current flowing in the hold coil 22 decays rapidly. Further, since current is not flowing in the control coil 21 at this time point, if the power transistors 213 and 214 for the control coil 21 are turned on for the short period Tohc, current instantaneously begins to flow in the control coil 21 in a direction opposite to that in the valve opening operations, and so a magnetic flux in the reverse direction is generated. Thus, overall magnetic flux can be decayed at a moment in the coil 21, which can largely reduce a delay in valve closing.

In the case where the width of the injection signal is short and nearly equal to Tp, the inverse voltage corresponding to Toc and that corresponding to Tohc are applied to the control coil 21 twice, and they overlap each other. Consequently, the inverse voltage is equivalently applied once to the control coil 21. In this case also, it is possible to reduce a delay in valve closing by setting the period during which the inverse voltage is applied to the control coil as a period of (Toc+Tohc), in order to effect rapid decay of the current flowing in the control coil 21 and the hold coil 22 to 0, or by adjusting the period of application of the inverse voltage, so that the inverse current begins to flow in the control coil 21 before the current flowing in the hold coil 22 decays.

In the second embodiment according to the present invention, although the application of an inverse voltage to the coils 21 and 22 is controlled, based on a preset time interval, it can be controlled based on information of current flowing in the coils 21 and 22, which is detected by using the hold coil current detection resistor 241 and the control coil current detection resistor 242. That is, based on information of the current level, the inverse voltage is applied to the control coil 21 until current flowing in the control coil 21 decreases to 0, and the inverse voltage is applied to the hold coil 21 until current flowing in the hold coil 21 decreases to 0, or the inverse voltage is applied to the control coil 21 until current flowing in the hold coil 21 decreases to 0. Further, in the second embodiment, although an inverse voltage is applied to both the coils 21 and 22, it is possible to apply an inverse voltage to only one of the coils 21 and 22.

Figure 9A:
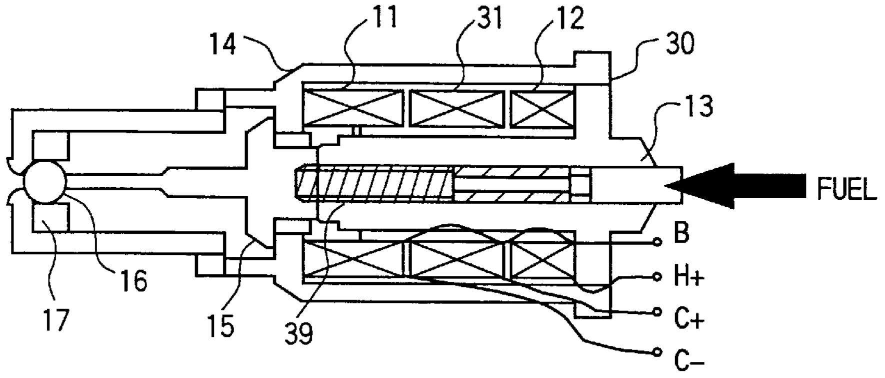
FIG. 9A and FIG. 9B are a vertical cross section of an electromagnetic fuel injection valve and a schematic diagram of wiring in a fuel injection apparatus using the valve, respectively, according to a third embodiment of the present invention.
Figure 9B:
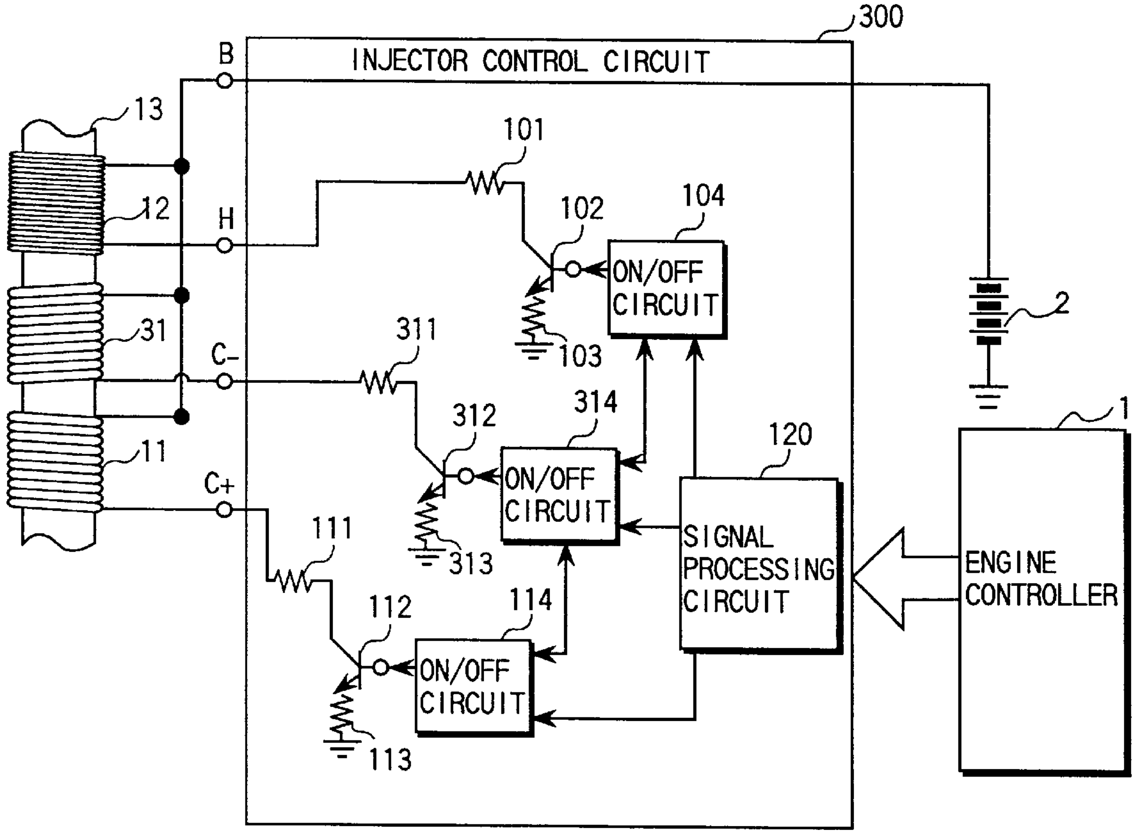
Figures 10A, 10B, 10C, 10D, 10E, 10F, 10G, 10H:
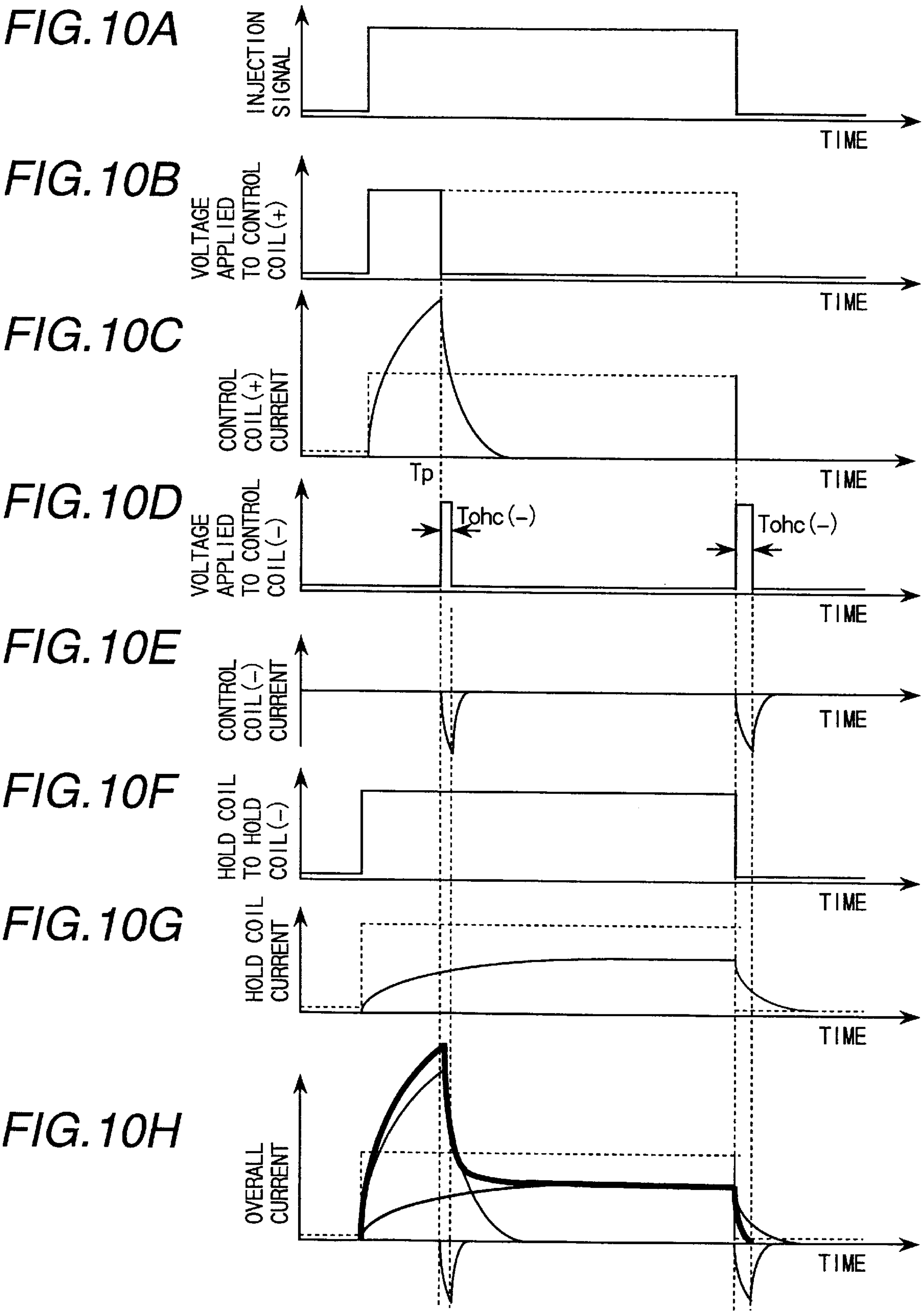
FIG. 10A–FIG. 10H are diagrams which show changes of the voltage and current in a control coil (+), a control coil (−), and a hold coil, corresponding to an injection signal output from an engine controller of the third embodiment according to the present invention.

In the following, a third embodiment according to the present invention will be explained with reference to FIG. 9A and FIG. 9B. FIG. 9A is a vertical cross section of an injector 30 of the third embodiment, and FIG. 9B is a schematic diagram of wiring for the injector 30 and an injector control circuit 300.

In the injector 30 of the third embodiment, a control coil (+) 11 and a hold coil 12 are provided similar to the first embodiment, and a further control coil (–) 31 is added to those coils. That is, three coils are provided. Since two control coils exist in this embodiment, these two control coils are distinguished by the notation of (+) and (–). The control coil (–) 31 generates electromagnetic characteristics of the large rate of magnetomotive force change with time, similar to the control coil (+) 11.

At the control coil (+) 11 and the hold coil 12, terminals B, H, and C+ (corresponds to C terminal in the first embodiment) are provided similar to the first embodiment. One terminal of the control coil (–) 31 is electrically connected to the B terminal, and the other terminal of the control coil (–) 31 is connected to the C– terminal. The manner of coil wincing and the wiring are set so that if the B terminal is connected to the minus terminal of the battery 2, and the C+, H, and C– terminals are connected to the plus terminal of the battery 2, magnetic flux in the control coil (–) is generated in a direction opposite to that of the magnetic flux generated in the control coil (+) 11 and the hold coil 12.

The composition of the injector 30 and the injector control circuit 300 will be explained with reference to FIG. 9B. As to the injector 30, only the core 13, the control coil (+) 11, the control coil (–) 31, and the hold coil 12, which are wound on the core 13, are shown in this figure. The wiring for the control coil (+) 11 and the hold coil 12 is similar to the first embodiment. Parts of this embodiment, which are different from the first embodiment, are mainly explained below.

The voltage from the battery 2 is fed to the injector control circuit 300, and by controlling the application of this voltage, the control circuit 300 controls current flowing in the control coil (–) 31, as well as the coils 11 and 12. In the injector control circuit 300, a transistor ON/OFF circuit 314 for the control coil (–) 31 and a resistor 311 expressing the equivalent internal resistance of the control coil (–) 31 and its drive circuit are newly added to the injector control circuit 100 of the first embodiment.

The respective transistor ON/OFF circuits 104, 114, and 314 commonly possess information on the current levels of the respective coils, as detected by the coil current detection resistors 103, 113, and 313. The transistor ON/OFF circuit 314 for the control coil (–) 31 sends a control signal for controlling current flow in the coil (–) 31, based on the commonly possessed information on current level and an output signal from a signal processing circuit 120, which is generated in response to the injection signal sent from the engine controller 1.

In the injector control circuit 300, the signal processing circuit 120 sends one more control signals to the transistor ON/OFF circuit 312 in comparison with the injector control circuit 100 in the first embodiment, and if the power transistor 312 for the control coil (–) 31 is turned on, the voltage from the battery 2 is applied to the control coil (–) 31.

In this embodiment also, it is desirable for the arrangement of the coils 11, 12 and 31, the core 13, and the yoke 14 to be arranged such that the control coil (+) 11 is nearer to the plunger 15. This is because of the same reason as that mentioned in the description of the first embodiment. Similarly, it is also advantageous to arrange the control coil (–) 31 nearer to the plunger. Thus, magnetic force attracting the plunger 15 is generated by magnetic flux passing through a magnetic path in the magnetic circuit composed of the core 13, the yoke 14, and the plunger 15.

A drive method of driving the injector 30 using the injector control circuit 300 will be explained below with reference to FIG. 10A–FIG. 10H, which FIG. 10A–FIG. 10H show operational states of the control coil (+) 11, the control coil (–) 31, and the hold coil 12, corresponding to the injection signal outputted from the engine controller 1.

Different aspects of the control method from the method used in the first embodiment are as follows. That is, after current flow in the control coil (+) 11 and the hold coil 12, is stopped, the power transistor 312 for the control coil (–) 31 is turned on twice, for two short periods Toc (–) and Tohc (–), and the voltage from the battery 2 is applied to the control coil (–) 31 for the two short periods. Thus, current flows in the control coil (–) 31, and a magnetic flux is generated in a direction opposite to that of the magnetic flux generated in the control coil (+) 11 and the hold coil 12 (in FIG. 10A–FIG. 10H, each direction of current flow in each coil corresponds to the direction of magnetic flux generated in the coil). The above mentioned coil arrangement and drive method can rapidly decrease the magnetic flux passing through the magnetic circuit to 0, which can largely reduce a delay in valve opening.

In the case where the width of the injection signal is short and nearly equal to Tp, the inverse voltage signals to be twice applied to the control coil (–) 31 (corresponding to Toc (–) and Tohc (–)) possibly overlap each other, which is equivalent to the inverse voltage being applied once to the control coil (–) 31. In this case also, it is possible largely to reduce a delay in valve closing by adjusting the period during which the inverse voltage is applied to the control coil, for example, as a period of (Toe (–) +Tohc (–)), so as to cause the overall magnetic flux passing through the magnetic circuit to decay to 0 rapidly.

As mentioned above, in accordance with the third embodiment, it is possible to realize a quick opening and a quick closing of the valve. Moreover, it is possible to realize a wide dynamic range of operation of the injector 30, the dynamic range being a basic performance evaluation item of the injector 30, by using two coils possessing the respective electromagnetic characteristics suitable for the operational stages of valve opening and valve open hold, while also using a third coil to cause the overall magnetic flux passing through the magnetic circuit to decay to 0 rapidly, without using a high voltage ore complicated control method.

In the following, a fourth embodiment, which represents a modification of the second and third embodiments, will be explained.

Figure 11:
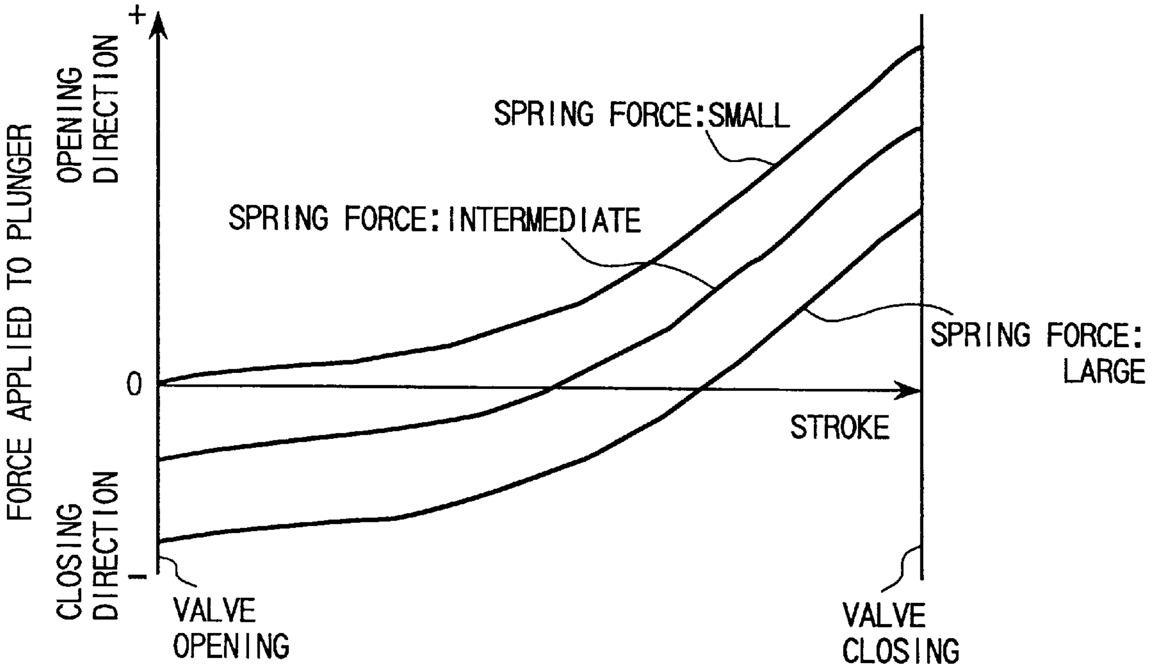
FIG. 11 is a timing diagram showing examples of combined force to realize a fourth embodiment according to the present invention.

If it is possible to secure the major part of the magnetic attraction force necessary to open the valve and the whole magnetic attraction force necessary to close the valve by using only the control coil 11, the valve can be opened or closed even if the magnetic flux necessary to hold the valve in an open state is always generated by the hold coil 12, that is, if current is allowed to continuously flow in the hold coil 12 throughout the opened valve state and the closed valve state. In the above-mentioned operation method, certainly to perform valve opening and valve closing with certainty, as shown in FIG. 11, it is necessary to set the combined effect of the magnetic attraction force caused by the magnetic flux generated in the hold coil 12 and the pressing force of the fuel pressure and the load of the return spring 18 as negative (in the valve closing direction) at the valve closed state at which the distance between the plunger 15 and the core 13, that is, the air gap, becomes maximum, and as positive (in the valve opening direction) at the opened valve state at which the air gap, becomes minimum. The bias component of the combined force can be adjusted by adequately setting the load of the return spring 18. By using the above-mentioned operation method, it is possible to realize an operational state of the injector 10 in which either an opened valve state or a closed valve state can be attained when a magnetic attraction force is not generated by the control coil 11.

In the fourth embodiment according to the present invention, a magnetic flux having a strength which is set as mentioned above is continuously generated in the hold coil 12. That is, while current continuously flows in the hold coil 12, valve opening operations are accelerated by generating a magnetic flux in the control coil 11 in the same direction in which magnetic flux is also generated in the hold coil 12, and the valve closing operation is accelerated by generating an inverse magnetic flux which is obtained by applying an inverse voltage to the control coil 11 or by using a coil possessing electromagnetic characteristics opposite to those of the control coil 11. In this operation method, if the number of turns and the internal resistance of the hold coil 12 are set to be large, it is possible to continue generation of magnetic flux with a low power consumption in the hold coil. Further, the power devices for switching the hold coil 12 can be omitted.

In an example representing a modification of the second embodiment shown in FIG. 7B, the power transistors 202, 203, 204, and 205, the transistor ON/OFF circuits 222, 223, 224, and 225, and the current detection resistor 241, are not necessary, and the H+ terminal is directly connected to the plus terminal of the battery 2, and the H– terminal is grounded.

In an example representing a modification of the third embodiment shown in FIG. 9B, the power transistor 102, the transistor ON/OFF circuit 104, and the current detection resistor 103, are not necessary, the B terminal is directly connected to the plus terminal of the battery 2, and the H terminal is grounded. By adopting the above-mentioned circuit arrangements of the fuel injection apparatus, it is possible to reduce the production cost of the fuel injection apparatus.

In the fourth embodiment according to the present invention, a permanent magnet can be used in place of the hold coil 12. As shown in FIG. 11, if the magnetic flux of the permanent magnet is set so that the combined effect of the magnetic attraction force caused by the magnetic flux generated by the permanent magnet and the pressing force of the fuel pressure and the load of the return spring 18 is negative (in the valve closing direction) at the closed valve state at which the distance between the plunger 15 and the core 13, that is, the air gap, becomes maximum, and the combined force is positive (in the valve opening direction) at the opened valve state at which the air gap becomes minimum, it is possible to realize the fourth embodiment without need to provide the hold coil 12. Two examples in which the above feature is applied to the respective second and third embodiments are shown in FIGS. 12A and 12B, and FIGS. 13A and 13B. Numerals 42 and 52 in FIG. 12A and FIG. 13A indicate a permanent magnet of a ring shape, which generates a magnetic flux in the same direction in which magnetic flux is generated in the control coil 41, or the control coil (+) 51, at the time of valve opening operations. By adopting this feature, as shown FIG. 12B and FIG. 13B, the circuits for driving the hold coil of the previous embodiments can be omitted, and the power consumed by those circuits becomes 0, which can reduce the production cost and the operation cost of the fuel injection apparatus.

In the first embodiment to the fourth embodiment, the timing to stop the current flow in the control coil is determined according to the preset period Tp or the preset level Imax for the usual operation conditions. Hereupon, Tp is determined as follow.

Figure 14:
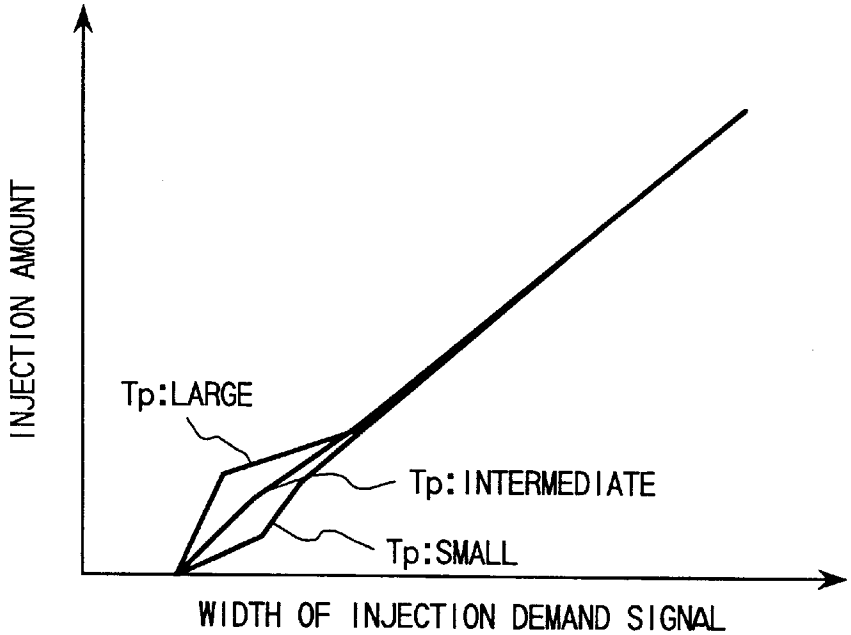
FIG. 14 is a graph which shows a relation between the time width of a injection demand signal and an injection amount, by using a coil current flowing period Tp during which current flows in the control coil, according to the present invention.
Figure 12A:
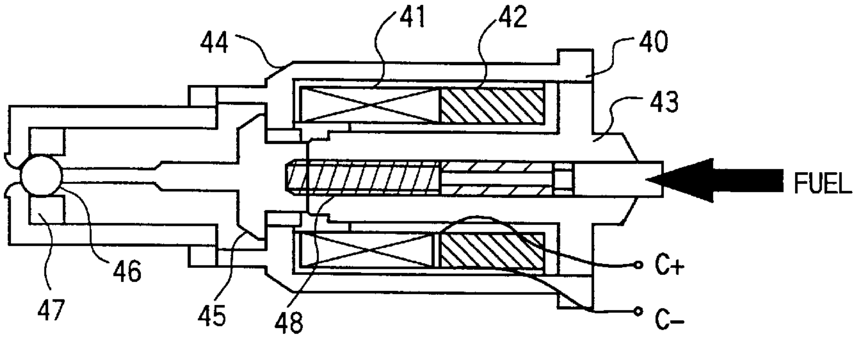
FIG. 12A and FIG. 12B are a vertical cross section of an electromagnetic fuel injection valve and a schematic diagram of wiring in an electromagnetic fuel injection apparatus (one coil) using the valve, respectively, according to the fourth embodiment of the present invention.
Figure 12B:
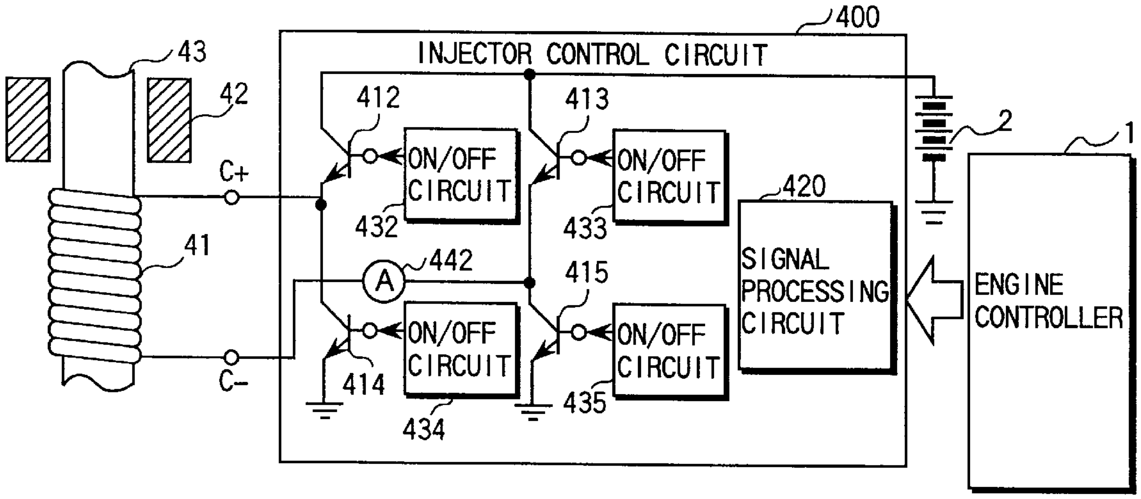
Figure 13A:
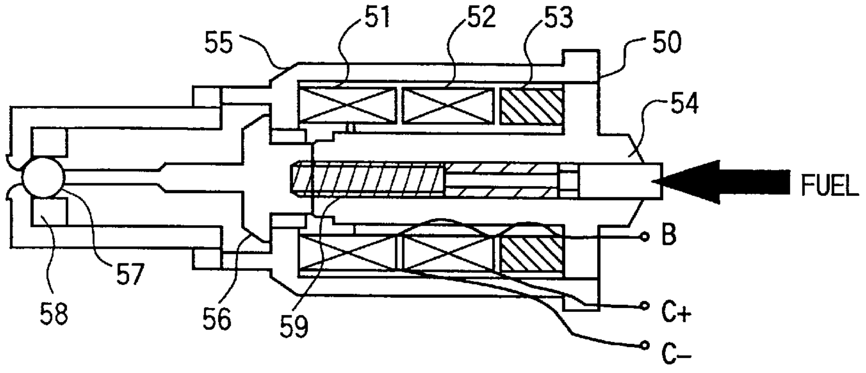
FIG. 13A and FIG. 13B are a vertical cross section of an electromagnetic fuel injection valve and a schematic diagram of wiring in an electromagnetic fuel injection apparatus (two coils) using the valve, respectively, according to the fourth embodiment of the present invention.
Figure 13B:
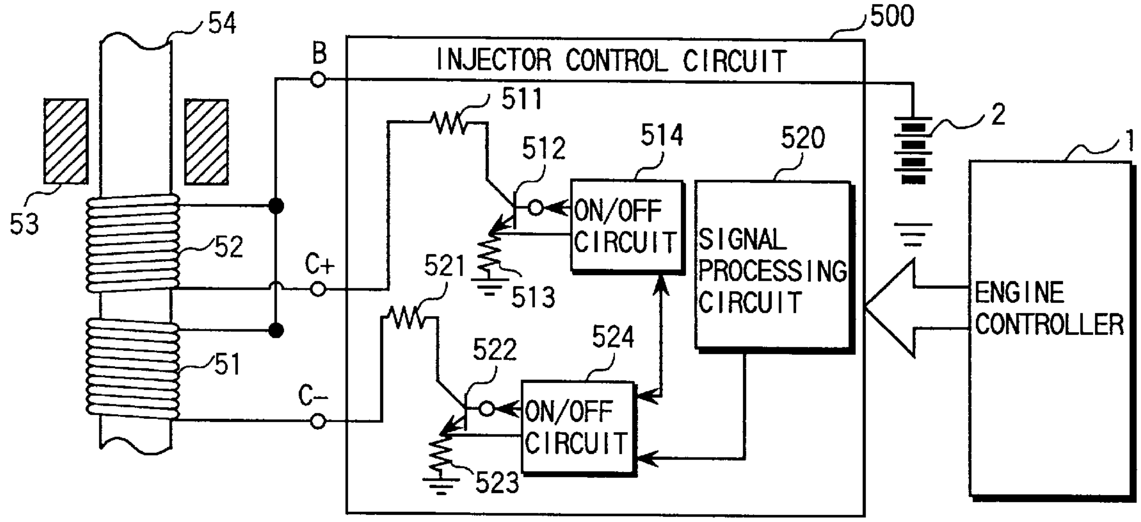

FIG. 14 shows a relation between the time width of an injection demand signal outputted from the engine controller 1 and the injection amount, by using the period Tp of current flow in the control coil as a variable, according to the present invention. The linearity of an injector refers to an index of the linearity in the relation between the time width of an injection demand signal and the injection amount, and the dynamic range of an injector is defined as the ratio of the maximum injection amount to the minimum injection amount, which can be attained in a range in which linearity is maintained. Generally, it is difficult to maintain linearity for a short time width of an injection demand signal. This is because, for a short time width, the valve open hold period during which fuel injection is most stably performed is relatively short in one injection cycle composed of a valve opening process, a valve open hold process, and a valve closing process, and the fuel injection tends to be instable. In a conventional injector, it has been very difficult to improve the operational performance for the short time width of an injection demand signal. By using the injector according to the present invention, since the coil arrangement is divided into a control coil part and a hold coil part, if Tp is increased without affecting the hold coil (during the valve opening hold period), the injection performance becomes a convex curve as shown in FIG. 14. On the contrary, if Tp is decreased without affecting the hold coil, the injection performance becomes a concave curve as shown in FIG. 14. Therefore, it is possible to easily adjust the injection performance of the injector optimally (holding the linearity) at a low injection amount. In the control method using Imax also, since the coil arrangement is divided into a control coil part and a hold coil part, if Imax is increased without affecting the hold coil (during the valve open hold period), the injection performance becomes a convex curve as shown in FIG. 14; and, if Imax is decreased without affecting the hold coil, the injection performance becomes a concave curve as shown in Fig.14. Therefore, in the Imax based coil current control method also, it is possible to easily adjust the injection performance of the injector optimally.

Although the injection performance can be optimally adjusted in each embodiment as mentioned above, it is desirable to set Tp variably, in order to give consideration to the possible occurrence of a disturbance, such as a decrease in the drive voltage, and an increase in the pressing force on the valve element due to an increase in the fuel pressure. Hereafter, the timing for stopping current flow in the control coil is denoted as Tc. Tc is basically changed according to an instruction sent from the engine controller 1. If the fuel pressure is rapidly increased by the pressure regulator 5 in response to a demand signal to raise the fuel pressure during a high load state of the engine 6, or if the voltage output of the battery 2 is significantly decreased such as at the time of starting of the engine 6 in a cold area, it is important to secure a necessary electromagnetic attraction force rather than the optimal injection performance.

Figure 15:
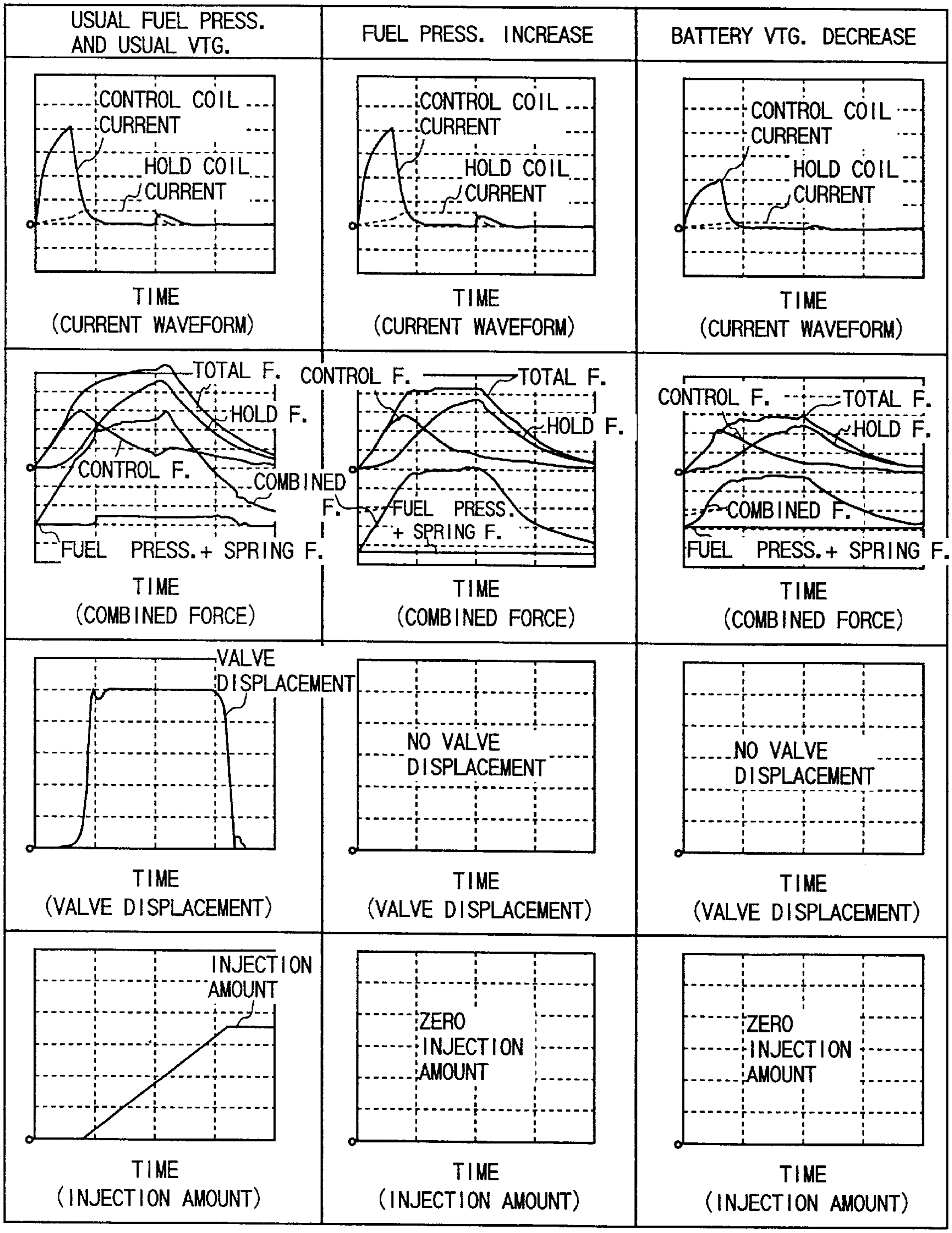
FIG. 15 is a chart which shows operational states of the fuel injection apparatus in which a coil current flowing period Tc is optimally adjusted at a usual fuel pressure and a usual battery voltage, under the respective conditions of usual fuel pressure and voltage, high fuel pressure, and a decrease of the battery voltage.

FIG. 15 shows operational states of the fuel injection apparatus in which the timing Tc of stopping coil current flow is optimally adjusted at a usual fuel pressure and a usual battery voltage, under the respective conditions of usual fuel pressure and drive voltage, high fuel pressure, and a decrease of the output voltage of the battery 2.

Current waveforms, the combined force, the valve displacement, and the injection amount will be explained below with reference to graphs showing the usual operational states under the conditions of usual fuel pressure and usual drive voltage.

At first, the current waveforms will be explained. In this example, Tc is set to about 0.3 ms, and the width of an injection demand pulse signal is set to 1 ms. Current flowing in the control coil is stopped at 0.3 m, and current flowing in the hold coil is continued for 1 ms. Since the control coil has fewer turns and a smaller internal resistance than the hold coil, current flowing in the control coil rises up quickly. This quick rising-up of the current contributes to a quick rising-up of electromagnetic attraction force generated in the control coil, as will be discussed in the following explanation of the combined force.

In a graph showing changes in the combined force, "plus" refers to the valve opening direction, and "minus" refers to the valve closing direction. After current flowing in the control coil is stopped at Tc, the attraction force decays rapidly. On the other hand, the attraction force generated by the hold coil increases gradually. The total attraction force is the sum of the two types of attraction force, which rises up rapidly to a large attained force. In this graph, the total load of the fuel pressure and the spring force pressing against the valve element in the valve closing direction, and the difference between the total attraction force and the total load is the combined force to drive the plunger. While the combined force is negative, the plunger is pressed against the valve seat, and the valve element is seated on the valve seat. Thus, valve displacement does not occur. When the combined force exceeds 0, the valve element begins to move in the valve opening direction. This valve motion will be described in the following explanation of the valve displacement.

When the valve displacement occurs and the fuel injection begins, a pressure balance occurs on either side of the valve element, which decreases somewhat of the load provided by the fuel pressure and the spring force. The combined effects of a decrease of the load and a decrease of the air gap between the core and the plunger cause a rapid and full opening of the valve. After the full opening of the valve, since the combined force is held as plus, the full opening state of the valve can be maintained, and fuel can be stably injected.

Meanwhile, the injection amount is determined by the opening area of the valve and the time duration of the injection. When the injection demand signal sent from the engine controller 1 is stopped at 1 ms, the attraction force begins to decrease. Further, at the same time, the combined force becomes minus, and the valve begins to be displaced in the valve closing direction. Since the gap between the core and the plunger is increased by the closing direction displacement of the valve, the attraction force further decreases, and the valve closing is accelerated. Moreover, when the valve element approaches a point near to the aperture part of the valve, the pressure difference of fuel is generated between the two sides of the valve element, and the pressing force in the valve closing direction is strengthened. Thus, the valve is rapidly closed, and the fuel injection is stopped. The above-mentioned phenomena occur in one cycle of fuel injection, including the operations of valve opening, holding the valve open, and valve closing.

Next, in the case of increased fuel pressure, although the current waveforms are almost the same as those under usual conditions (the waveforms become slightly different from those under the usual conditions because of no valve displacement), since the load produced by the fuel pressure and the spring force is larger, and the combined force can not exceed 0, the valve can not be opened. Moreover, since the valve does not open, both the decreasing of the gap and the pressure balance on either side of the valve element do not occur, and the force for driving the valve is not further strengthened.

Similar to the above case of an increase in fuel pressure, if the voltage of the battery is decreased, the current flowing in the control coil and the hold coil is smaller. Therefore, the combined force can not exceed 0, and the valve can not be opened. Also, both the decreasing of the gap and the pressure balance at the valve element do not occur, and the force for driving the valve is not further increased.

As mentioned above, by using the value Tc optimally adjusted under the conditions of the usual fuel pressure and the usual battery voltage, it is impossible to take account of states of the high fuel pressure and a decrease in the battery voltage. These phenomena are due to insufficient electromagnetic attraction force. If the valve is opened by any amount, valve opening is accelerated by reduction of the gap and the occurrence of the pressure balance on either side of the valve element. Therefore, it is not necessary to increase the electromagnetic attraction force two or three times that necessary under normal conditions, but only a little increase of the attraction force is sufficient.

In the injector according to the present invention, it is possible to increase the electromagnetic attraction force beyond the optimal value for the usual conditions by extending Tc, which is adjusted relative to the usual fuel pressure and the usual battery voltage.

Figure 16A:
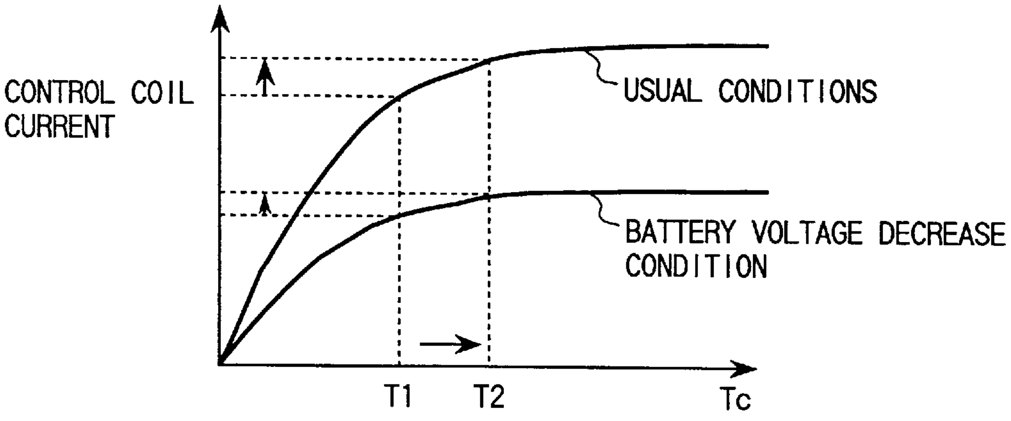
FIG. 16A–FIG. 16C are graphs which show effects for coil current and magnetic attraction force, which are caused by extending the coil current flowing period Tc optimally adjusted at a usual fuel pressure and a usual battery voltage.
Figure 16B:
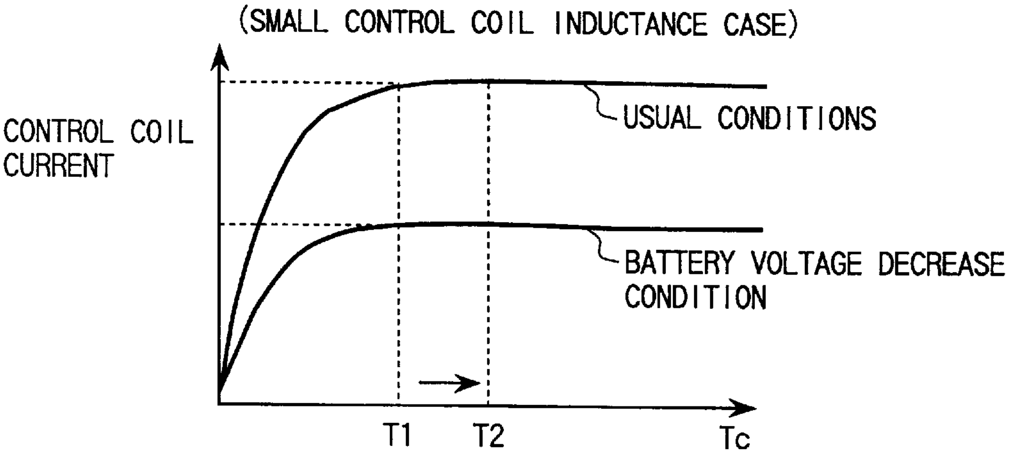
Figure 16C:
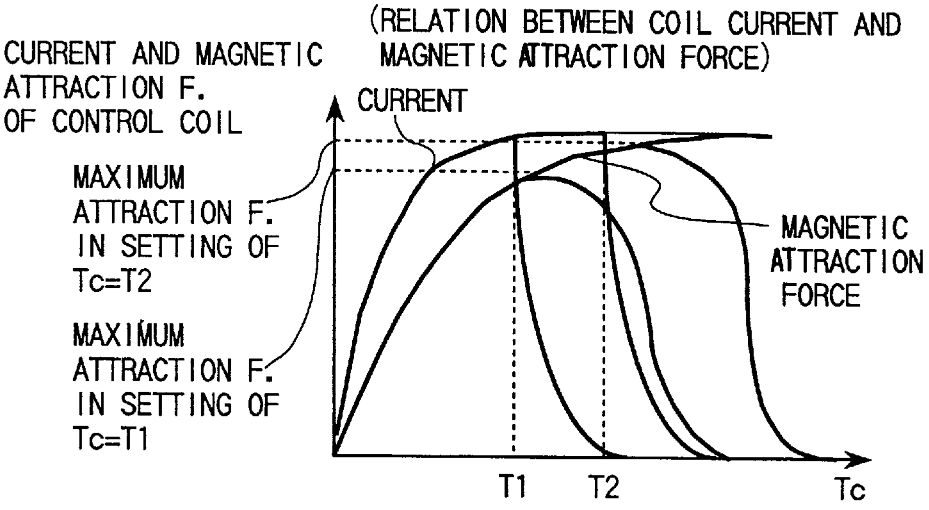

FIG. 16A–FIG. 16C show the effects on coil current and magnetic attraction force caused by extending the coil current stopping timing Tc optimally adjusted in accordance with the usual fuel pressure and the usual battery voltage. FIG. 16A shows a case in which the inductance of the control coil is large, and current flowing in the control coil does not reach the maximum value at Tc (=T1) optimally adjusted to the usual fuel pressure and the usual battery voltage. In this case, by extending Tc from T1 to T2, more current flows and a larger electromagnetic force is generated than those in the case of fixing Tc to T1.

Therefore, in the case of an increase in fuel pressure, it is effective to extend Tc optimally adjusted to the usual fuel pressure and the usual battery voltage. The above countermeasures can be similarly applied to the case of a decrease in battery voltage. Thus, in this case also, by extending Tc from T1 optimally adjusted to the usual fuel pressure and the usual battery voltage to T2, more current flows and a larger electromagnetic force can be generated than in the case of fixing Tc to T1.

Generally, the problem of a decrease in the battery voltage occurs mainly at the time of starting of an engine in a cold area. However, since the fuel pump itself for pressurizing fuel is driven by a cam shaft or a motor, fuel at a high pressure is not fed to the injector right after the starting of the engine. Therefore, the above mentioned countermeasures are also sufficient to solve the problem of a decrease in the battery voltage.

FIG. 16B shows the case in which the inductance of the control coil is small, and current in the control coil has already reached the maximum value, which is determined by a circuit constant of the control coil, at Tc (=T1) optimally adjusted to the usual fuel pressure and the usual battery voltage. In this case, an increase in the magnitude of current does not occur in spite of extending Tc from T1 to T2. However, there exists a phase delay between the rising of the current and the rising of the electromagnetic force generated by the current.

Therefore, although the current reaches almost its maximum value at T1, the electromagnetic force does not reach its maximum value yet because of the phase delay, as indicated in FIG. 6C, which shows changes in the current flowing in the control coil and the electromagnetic force generated by the current. In this situation, by extending Tc from T1 optimally adjusted to the usual fuel pressure and the usual battery voltage to T2, a larger maximum value of electromagnetic force can be attained than is attained in the case of fixing Tc to T1, and the possibility of valve opening increases.

If a decrease in the coil drive voltage or an increase in the load applied to the valve element, which is caused by an increase in the fuel pressure, are remarkably large, it is also effective to extend Tc until the end of the injection demand signal, that is, to maintain current flow in both the control coil and the hold coil during the duration of the injection demand signal outputted from the engine controller 1. As shown in FIG. 15, in operations according to the usual timing of Tc, the attraction force generated by the hold coil does not rise up sufficiently when current flow in the control coil is stopped. Thus, by extending the timing Tc for stopping current flowing in the control coil until the attraction force generated by the hold coil rises up sufficiently, it is possible to obtain a large total attraction force to correspond to a very large pressing load on the valve element.

In addition to an increase in the internal resistance of the coils, the resistance of wires in the injector control circuit and wires between the injector and the injector control circuit also increase as the temperature increases. Also, aged deterioration of the elements increases the resistance. The increase in the resistance of the wires causes a decrease in the driving voltage applied to the coils. This decrease in the driving voltage, due to an increase in the resistance of the wires, can not be detected by the volt meter 8, which is provided in the vicinity of the battery 2, for detecting the voltage of the battery 2. This problem can be solved by comparing the current flowing in the coils and the battery voltage, which is executed in the injector control circuit by using the coil current detection resistors and the signal processing circuit. That is, detecting a decrease in the driving voltage becomes possible by results of the comparison to estimate whether the internal resistance of the whole coil drive system is increased at the present time in comparison with that under usual conditions. If it is determined that a decrease in the driving voltage is occurring, the engine controller 1 controls Tc optimally adjusted to the usual voltage, so that it is extended, similar to the above-mentioned case of a decrease in the battery voltage.

Figure 17:
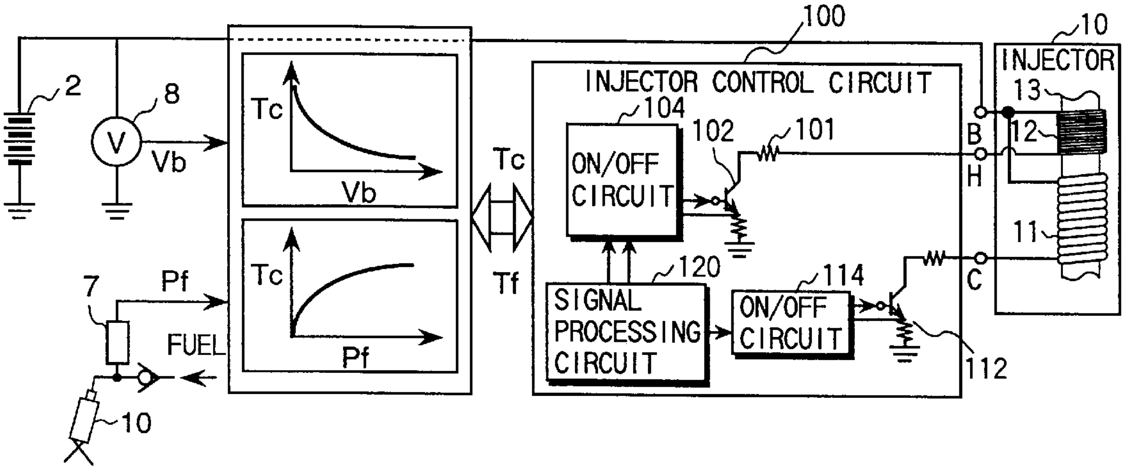
FIG. 17 is a schematic block diagram of an example of a system for controlling the coil current flowing period Tc for a control coil 11 according to the present invention.

FIG. 17 shows a conceptual diagram of a system for adjusting the timing Tc for stopping current flow in the control coil 11. Although a system for an injector including two coils is provided in this embodiment, a Tc adjustment system for an injector including three coils can be used to realize similar effects. As shown in FIG. 17, the fuel pressure Pf detected by the fuel pressure sensor 7 and the battery voltage Vb detected by the volt meter 8 are inputted to the engine controller 1. The engine controller 1 stores, for example, the relation between the battery voltage Vb and the optimal value of Tc for stopping current flow in the control coil 11. Similarly, the relation between the fuel pressure Pf and the optimal value of Tc is stored.

In FIG. 17, the two relations between the optimal value of TC and respective values of fuel pressure and battery voltage are stored. However, it is also possible to store a three-dimensional map expressing the relation between the optimal timing Tc and the two parameters Vb and Pf. Further, it is possible to obtain the optimal value of Tc as a value of a function expressed by either or both of the two variables Vb and Pf. Moreover, although not shown in FIG. 17, the temperature of the engine compartment can be used as a parameter.

As mentioned above, if the fuel pressure is increased, it is necessary to extend the timing Tc for stopping current flow in the control coil. Further, if the battery voltage is decreased, it is necessary to extend the timing Tc for stopping current flow in the control coil. The engine controller 1 can recognize the occurrence of those situations, or store information indicating those situations.

The injection demand signal Sf and the timing Tc for stopping current flow in the control coil 11, which are factors determined by the engine controller 1, are inputted to the injector control circuit 100. Further, the signal processing circuit 120 counts the time left relative to the timing Tc, and sends ON/OFF signals to the transistor ON/OFF circuit 114 for the control coil 11, thereby controlling current flow in the control coil 11. Thus, the battery voltage is applied to the control coil 11 until Tc is reached.

Furthermore, it can be determined whether the internal resistance of the whole coil drive system becomes larger then that under usual conditions, by examining the coil current detection resistor, the voltage of the battery 2, and the detected coil current, the signal processing circuit 120. If it is determined that the internal resistance increases, Tc is extended. The quantity of the Tc extension is effected by either the engine controller 1 or the signal processing circuit 120.

If it is preferable to change the period of application of an inverse voltage to either or both of the control coil 11 and the hold coil 12 during valve closing operations, the application of the inverse voltage can be controlled in the same manner as for controlling Tc.

A method of generating and transmitting a fuel injection demand signal, which is sent from the engine controller 1 to the injector control circuit, to realize this embodiment, will be explained below with reference to FIG. 18A–FIG. 18D. Although this method will be explained by reference to the injector control circuit 100 shown in FIG. 1, this method is also applicable to other embodiments.

In this method, the fuel injection demand signal outputted from the engine controller 1 to the injector control circuit 100 includes at most three items of information, including the fundamental injection demand time width Tf, the coil drive voltage applying period Tc for valve opening, and the inverse voltage applying period Toc in the case of applying an inverse voltage to the coils. If these three items of information are respectively transmitted, three sets of wiring and ports are necessary, which increases the transmission capacity and the production cost.

Figure 18A:
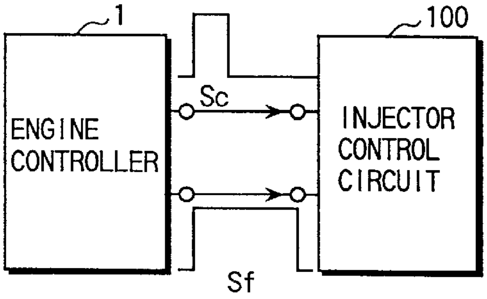
FIG. 18A–FIG. 18D are diagrams which show examples of a transmission method of transmitting signal integration information on a fuel injection demand time width Tf, the timing for stopping current flow in the control coil Tc, and a period of reverse current flow in the control coil and the hold coil Toc.
Figure 18B:
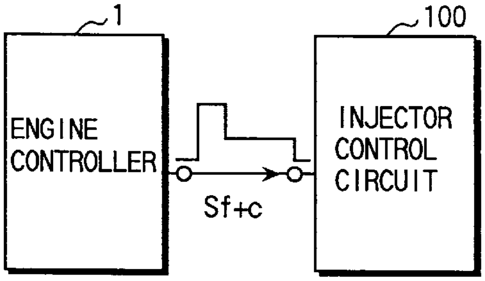

Therefore, in this method, as shown in FIG. 18B, a hybrid signal, into which a plurality of voltage timing signals to be sent to a plurality of coils are integrated, is transmitted by using only one line. The hybrid signal can be easily decomposed into two or three signals by the signal processing circuit 120 in the injector control circuit 100.

Figure 18C:
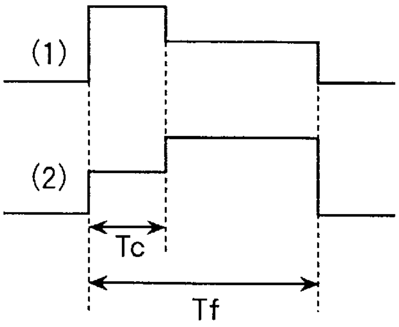
Figure 18D:
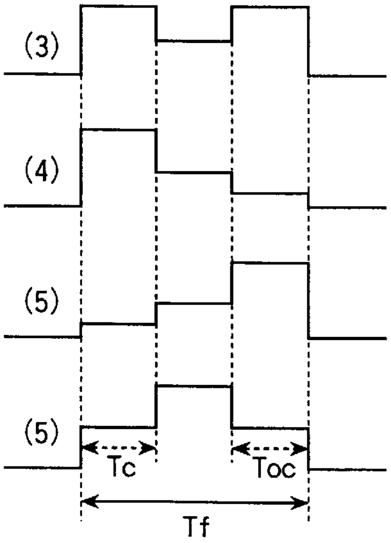

FIG. 18C shows examples of hybrid signals including two items of information, including the fundamental injection demand time width Tf and the timing Tc for stopping the application of the coil drive voltage; and, FIG. 18C also shows examples of hybrid signals including three items of information, including the fundamental injection demand time width Tf, the timing Tc for stopping the application of the coil drive voltage, and the inverse voltage applying period Toc. Since the timing of (N−1) items can be separated, where N is the number of rising edges and trailing edges appearing in the hybrid signal, one hybrid signal can transmit a plurality of items of timing, and can control current flowing in a plurality of coils.

Figure 19:
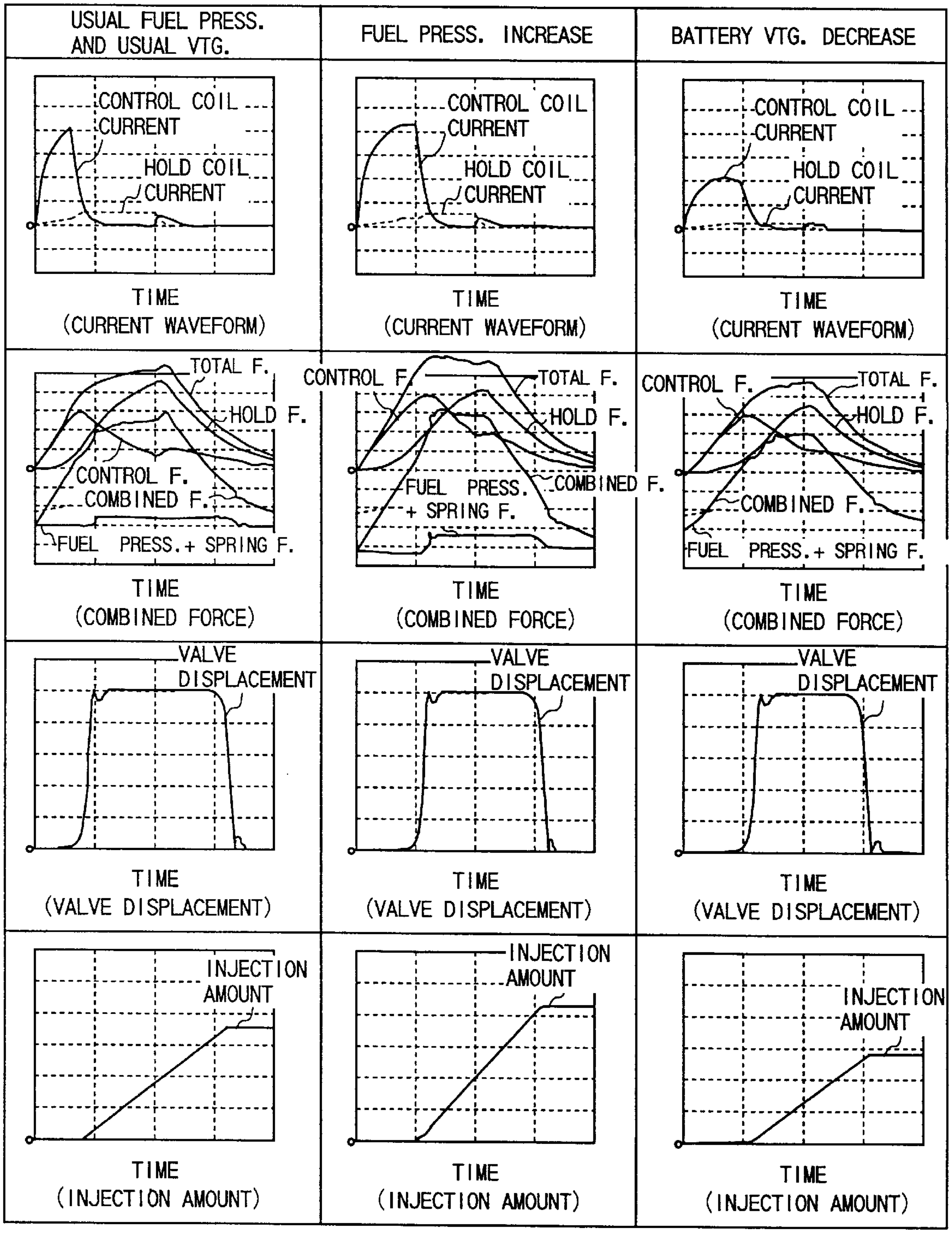
FIG. 19 is a chart which shows operational states of the fuel injection apparatus in the case of extending the period Tc, in that the valve which can not be opened under the respective conditions of high fuel pressure and a decrease of the battery voltage with the fixed period Tp, in the case shown in FIG. 15, can be opened.

FIG. 19 shows operational states of the fuel injection apparatus in the case of extending the timing Tc. Although a valve can not be opened under the respective conditions of high fuel pressure and a decrease of the battery voltage by using the fixed timing Tc, as shown in FIG. 15, the valve can be opened by extending the timing TC. In the case shown in FIG. 15, Tc is fixed to 0.3 ms at which the best linearity of the injection performance is realized in operating the injector under the conditions of the usual fuel pressure and the usual battery voltage. On the other hand, in the case shown in FIG. 19, it becomes possible to open the valve by setting Tc to 0.5 ms. If Tc is always set to 0.5 ms, the valve can be opened under the conditions of both the usual fuel pressure and the usual battery voltage, as well as in the case of a decrease in the battery voltage. However, since an unnecessarily large power is inputted to the control coil in this case under the conditions of the usual fuel pressure and the usual battery voltage, the power consumption becomes large. Moreover, the acceleration applied to the valve element becomes too large under the usual conditions because of the larger Tc, and the valve element strongly collides with the stopper and rebounds, which deteriorates the linearity of the fuel injection amount relative to the width of the injection pulse signal.

In the injector and the fuel injection apparatus of the above embodiments, the operations of the valve are controlled under the usual operation conditions, while the injection linearity is secured, and in the non-usual operational states, such as a decrease in the battery voltage, the valve element also can be normally operated, based on adequate adjustment of the timing Tc (0.5 ms) for stopping current flow in the control coil, which is determined by the engine controller 1. When the battery voltage is recovered to the normal level, Tc is automatically returned to the usual timing 0.3 ms.

In the injector and the injection control circuit of the above-described embodiment, a wide dynamic range of operation of the injector can be realized. Further, since the average diameter of fuel drops is reduced to minimum by the swirler in the injector, it is possible to sufficiently satisfy the requirement for uniform fuel burning and stratified fuel burning for a direct injection engine.

Further, the injector and the injection control circuit of the above-described embodiment are applicable to an engine other than a direct injection engine, such as, for example, a port injection engine, and so a wide dynamic range also can be realized for an engine other than a direct injection engine. Further, the average diameter of fuel drops is reduced to minimum by the swirler in the injector, which considerably improves the output power of the engine and effects a reduction of the fuel consumption.

In accordance with the present invention, the response time of the valve element operating from the closed valve state to the opened valve state is improved independently of the reduction of the power consumption during the valve opening hold period. Therefore, it is possible to provide an electromagnetic fuel injection valve having a composition such that a quick response can be realized in operations of a valve element from the closed valve state to the opened valve state, and the valve open state can be stably maintained with a low power consumption after the valve opening operations are finished.

Further, in accordance with the present invention, since the response of the valve element operating from the closed valve state to the opened valve state is improved independently of any reduction in the power consumption during the valve open hold period, even if the time width for which the valve is held in the valve open state is short, a small amount of fuel can be accurately injected. Therefore, it is possible to provide a fuel injection apparatus having a wide dynamic range of operation for fuel injection. Further, since the power consumption during the valve open hold period can be reduced, it is possible to provide also a fuel injection apparatus having a low power consumption.

Further, in accordance with the present invention, since the response of the valve element operating from the closed valve state to the opened valve state is improved independently of any reduction in the power consumption curing the valve open hold period, fuel is also accurately injected in the range of a small fuel amount. Therefore, it is possible to provide an internal combustion engine which is capable of maintaining stable operations even in a range of small fuel injection.

Furthermore, in accordance with the present invention, since the response of the valve operating from the closed valve state to the opened valve state is improved independently of any reduction in the power consumption during the valve open hold period, it is possible to provide a fuel control method to realize a quick response of the valve at valve opening and closing operations and a low power consumption during valve open hold operations.

What is claimed is:

1. An electromagnetic fuel injection valve for injecting fuel by opening/closing a fuel flowing path, including a valve seat, a valve element for opening/closing said fuel flowing path formed between said valve seat and said valve element, and drive means having at least one coil for driving said valve element, wherein said drive means includes first magnetomotive force generating means using said at least one coil and second magnetomotive force generating means, said first magnetomotive force generating means and said second magnetomotive force generating means being composed so that said first magnetomotive force generating means generates and raises its magnetomotive force at a larger rate of change in time in comparison with that of said second magnetomotive force generating means.

2. An electromagnetic fuel injection valve according to claim 1, wherein one of a permanent magnet and a coil in which a constant current continuously flows through both an opened valve period and a closed valve period, is provided as said second magnetomotive force generating means.

3. An electromagnetic fuel injection valve according to claim 1, wherein said second magnetomotive force generating means includes a second coil of which the number of turns is larger than that of said at least one coil.

4. An electromagnetic fuel injection valve according to claim 1, wherein the wire diameter of a first coil used as said at least one coil is larger than that of a second coil used as said second magnetomotive force generating means.

5. An electromagnetic fuel injection valve according to claim 1, wherein said drive means includes said at least one first coil and a second coil provided as said second magnetomotive force generating means, said first coil and said second coil being composed so that if the same voltage having a rectangular waveform is applied to said first and second coils, the rise time of magnetomotive force generated in said second coil is longer than that in said first coil, and a saturation value of current flowing in said second coil is smaller than that flowing in said first coil.

6. A fuel injection apparatus for injecting fuel by opening/closing a fuel flowing path, which includes an electromagnetic fuel injection valve having a valve seat, a valve element for opening/closing said fuel flowing path formed between said valve seat and said valve element, and drive means having at least one coil for driving said valve element, and control means for operating said electromagnetic fuel injection valve by controlling current flowing in said at least one coil, wherein said drive means includes first magnetomotive force generating means using said at least one coil and second magnetomotive force generating means, said coil and said second magnetomotive force generating means generating a combined magnetomotive force in a direction in which said force generated by said coil and said force generated by said second means strengthen each other at an initial valve opening time at which said valve element is driven from a closed valve state to an valve opening state, said coil raising its magnetomotive force at a larger rate of change in time in comparison with that of said second magnetomotive force generating means, and said current flowing in said coil is stopped during a valve opening hold period for which a valve opening position of said valve element is held by magnetomotive force generated by said second magnetomotive force generating means.

7. A fuel injection apparatus according to claim 6, wherein one of a permanent magnet and a coil in which a constant current continuously flows through both an opened valve period and a closed valve period, is provided as said second magnetomotive force generating means.

8. A fuel injection apparatus according to claim 6, wherein a first coil is provided as said at least one first coil, and a second coil is provided as said second magnetomotive force generating means.

9. A fuel injection apparatus according to claim 8, wherein reverse current flows in said first coil for a preset period, after which the current flow in said first coil is stopped, and reverse current flows in at least one of said first coil and said second coil for a preset period at the end of a fuel injection demand signal.

10. A fuel injection apparatus according to any one of claims 6 to 9, further including at least one of a pressure sensor for detecting pressure of fuel fed to said fuel injection valve and a voltage sensor for detecting voltage applied to said first and second magnetomotive force generating means, wherein said control means includes storage means for storing at least one of a relation between fuel pressure and timing of stopping current flow in said coil as said first magnetomotive force generating means and a relation between voltage applied to said first and second magnetomotive force generating means and timing of stopping current flow in said coil as said first magnetomotive force generating means, and determines timing of stopping current flow in said coil as said first magnetomotive force generating means, based on at least one of fuel pressure and voltage applied to said first and second magnetomotive force generating means which have been detected by said pressure sensor and said voltage sensor, respectively, and a corresponding one of said relations.

11. An internal combustion engine into which fuel is injected by opening/closing a fuel flowing path, which includes a fuel tank, a fuel pump for feeding and pressurizing fuel from said fuel tank, an electromagnetic fuel injection valve for injecting fuel pressurized by said fuel pump, which has a valve seat, a valve element for opening/closing said fuel flowing path formed between said valve seat and said valve element, and drive means having at least one coil for driving said valve element, and control means for determining fuel injection timing and necessary fuel injection amount to be injected from said electromagnetic fuel injection valve and for operating said electromagnetic fuel injection valve by controlling current flowing in said coil, wherein said drive means includes coil first magnetomotive force generating means using said at least one coil and second magnetomotive force generating means, said coil and said second magnetomotive force generating means generating magnetomotive force in the same direction in which said force generated in said coil and said force generated in said second means strengthen each other at an initial valve opening time at which said valve element is driven from a closed valve state to a valve opening state, said coil raising its magnetomotive force at a larger rate of change in time in comparison with that of said second magnetomotive force generating means, and current flowing in said coil is stopped during a valve hold period in which a valve opening position of said valve element is held by magnetomotive force generated by said second magnetomotive force generating means.

12. An internal combustion engine according to claim 11, wherein one of a permanent magnet and a coil in which a constant current continuously flows through both an opened valve period and a closed valve period is provided as said second magnetomotive force generating means.

13. An internal combustion engine according to claim 11, wherein a first coil is provided as said at least one coil, and a second coil is provided as said second magnetomotive force generating means.

14. An internal combustion engine according to claim 13, wherein reverse current is flows in said first coil for a preset period, after which current flow in said first coil is stopped, and reverse current flows in at least one of said first coil and said second coil for a preset period at the end of a fuel injection demand signal.

15. An internal combustion engine according to any one of claims 11 to 14, further including at least one of a pressure sensor for detecting pressure of fuel fed to said fuel injection valve and a voltage sensor for detecting voltage applied to said first and second magnetomotive force generating means, wherein said control means includes storage means for storing at least one of a relation between fuel pressure and timing of stopping current flow in said coil as said first magnetomotive force generating means and a relation between voltage applied to said first and second magnetomotive force generating means and timing of stopping current flow in said coil as said first magnetomotive force generating means, and determines timing of stopping current flow in said coil as said first magnetomotive force generating means, based on at least one of fuel pressure and voltage applied to said first and second magnetomotive force generating means which have been detected by said pressure sensor and said voltage sensor, respectively, and a corresponding one of said relations.

16. A method of injecting fuel by opening/closing a fuel flowing path with a valve element of an electromagnetic fuel injection valve including first magnetomotive force generating means and second magnetomotive force generating means, which valve element is driven by magnetomotive force generated by using said first magnetomotive force generating means and said second magnetomotive force generating means, said fuel flowing path being formed between said driven valve element and a valve seat to which said valve element is seated, said method comprising the steps of:

generating magnetomotive force with at least one coil provided as said first magnetomotive force generating means and with second magnetomotive force generating means in a force direction in which said force generated with said at least one coil and said force generated with said second means strengthen each other at an initial valve opening time at which said valve element is driven from a closed valve state to a valve opening state, so that said force generated with said at least one coil is raised with a larger rate of change in time in comparison with that generated with said second magnetomotive force generating means; and stopping current flowing in said at least one coil during a valve hold period in which an open position of said valve element is held by said force generated with said second magnetomotive force generating means.

17. A method of injecting fuel, according to claim 16, wherein one of a permanent magnet and a coil in which a constant current continuously flows through both an opened valve period and a closed valve period is provided as said second magnetomotive force generating means.

18. A method of injecting fuel, according to claim 16, wherein a first coil is provided as said at least one coil, and a second coil is provided as said second magnetomotive force generating means.

19. A method of injecting fuel, according to claims 18, wherein reverse current flows in said first coil for a preset period, after which current flow in said first coil is stopped, and reverse current flows in at least one of said first coil and said second coil for a preset period at the end of a fuel injection demand signal.

20. A method of injecting fuel, according to claim 16, further including the step of storing in advance at least one of a relation between fuel pressure and timing of stopping current flow in said at least one coil as said first magnetomotive force generating means and a relation between voltage applied to said first and second magnetomotive force generating means and timing of stopping current flow in said at least one coil used as said first magnetomotive force generating means.

21. A method of injecting fuel, according to any one of claims 16 to 20, wherein pressure of fuel fed to said electromagnetic fuel injection valve is detected, and if said detected pressure is higher than in a usual state, a period for which current is allowed to flow in said at least one coil used as said first magnetomotive force generating means is controlled to be extended.

22. A method of injecting fuel, according to any one of claims 16 to 20, wherein voltage applied to said first coil is detected, and if said detected voltage is lower than in a usual state, a period for which current is allowed to flow in said at least one coil used as said first magnetomotive force generating means is controlled to be extended.

* * * * *